US012444479B2

(12) United States Patent
Chen et al.

(10) Patent No.: US 12,444,479 B2
(45) Date of Patent: Oct. 14, 2025

(54) METHOD FOR DETERMINING PREGNANCY STATUS OF PREGNANT WOMAN

(71) Applicant: BGI GENOMICS CO., LTD., Guangdong (CN)

(72) Inventors: Ruoyan Chen, Guangdong (CN); Jinjin Xu, Guangdong (CN); Xin Jin, Guangdong (CN)

(73) Assignee: BGI GENOMICS CO., LTD., Guangdong (CN)

( * ) Notice: Subject to any disclaimer, the term of this patent is extended or adjusted under 35 U.S.C. 154(b) by 288 days.

(21) Appl. No.: 18/032,661

(22) PCT Filed: Oct. 20, 2020

(86) PCT No.: PCT/CN2020/122214
§ 371 (c)(1),
(2) Date: Apr. 19, 2023

(87) PCT Pub. No.: WO2022/082436
PCT Pub. Date: Apr. 28, 2022

(65) Prior Publication Data
US 2023/0386607 A1    Nov. 30, 2023

(51) Int. Cl.
G16B 30/00    (2019.01)
G16B 40/20    (2019.01)
G16H 50/20    (2018.01)

(52) U.S. Cl.
CPC ............ *G16B 30/00* (2019.02); *G16B 40/20* (2019.02); *G16H 50/20* (2018.01)

(58) Field of Classification Search
None
See application file for complete search history.

(56) References Cited

U.S. PATENT DOCUMENTS

2006/0003342 A1*  1/2006  Bianchi ............... C12Q 1/6881
                                                         435/6.12
2016/0017412 A1    1/2016  Srinivasan et al.
(Continued)

FOREIGN PATENT DOCUMENTS

CN    201910655857 A    12/2019
CN    110785499 A        2/2020
(Continued)

OTHER PUBLICATIONS

Peng et al. Bioinformatics Approaches for Fetal DNA Fraction Estimation in Noninvasive Prenatal Testing; International Journal of Molecular Sciences 2017, 18, 453; doi:10.3390/ijms18020453.*
Szilyagi et al. Circulating Cell-Free Nucleic Acids: \Main Characteristics and Clinical Application, International Journal of Molecular Sciences. 2020, 21, 6827; doi:10.3390/ijms21186827.*
(Continued)

*Primary Examiner* — David J Stoltenberg
(74) *Attorney, Agent, or Firm* — Duane Morris LLP

(57) ABSTRACT

Provided is a method for constructing a prediction model used for predicting a pregnancy status of a pregnant woman. The method includes: step 1 of constructing a training set and an optional test set, the training set and the optional test set each consisting of a plurality of pregnant woman samples, the pregnant woman samples each having a known pregnancy status; step 2 of determining, for each pregnant woman sample in the training set, a predetermined parameter of the pregnant woman sample, the predetermined parameter including differentially expressed gene information of the pregnant woman sample, the differentially expressed gene information being obtained through calculation based on sequencing information of fetal cell-free nucleic acids in peripheral blood of the pregnant woman sample; and step 3 of constructing the prediction model based on the known pregnancy status and the predetermined parameter.

10 Claims, 5 Drawing Sheets

(56) References Cited

U.S. PATENT DOCUMENTS

| | | | |
|---|---|---|---|
| 2016/0110497 A1* | 4/2016 | Dzakula | G16B 40/00 |
| | | | 702/20 |
| 2018/0105807 A1* | 4/2018 | Lo | C12Q 1/6888 |
| 2018/0327844 A1* | 11/2018 | Deciu | G16B 20/00 |
| 2018/0327847 A1* | 11/2018 | Kapur | G01N 33/6893 |
| 2019/0062832 A1 | 2/2019 | Srinivasan et al. | |
| 2019/0376140 A1* | 12/2019 | Chim | A61K 31/713 |
| 2020/0123532 A1* | 4/2020 | Lo | G16B 40/00 |
| 2020/0270694 A1* | 8/2020 | Lo | C12Q 1/6827 |
| 2020/0407793 A1* | 12/2020 | Grömminger | G16B 30/00 |
| 2021/0017598 A1* | 1/2021 | Jain | C12Q 1/6809 |
| 2021/0020314 A1* | 1/2021 | Ehrich | G16H 50/70 |
| 2022/0056534 A1* | 2/2022 | Rivers | C12Q 1/6869 |

FOREIGN PATENT DOCUMENTS

| | | |
|---|---|---|
| CN | 111566228 A | 8/2020 |
| WO | 2019191319 A1 | 10/2019 |
| WO | 2020154402 A1 | 7/2020 |

OTHER PUBLICATIONS

International Search Report and Written Opinion for PCT/CN2020/122214 issued Apr. 27, 2021, 11 pages.

CNIPA First Office Action of the Priority Application No. CN202080106438.1 (English translation),Sep. 30, 2024, 10 pages.

Second Office Action for Chinese Application No. or Publication No. 202080106438.1 with translation issued by the Chinese State Intellectual Property Office.

* cited by examiner

METHOD FOR DETERMINING PREGNANCY STATUS OF PREGNANT WOMAN

PRIORITY CLAIM AND CROSS-REFERENCE

The present application is a National Stage Application, filed under 35 U.S.C. 371, of International Patent Application No. PCT/CN2020/122214, filed on Oct. 20, 2020, which is incorporated herein by reference in its entirety.

TECHNICAL FIELD

The present disclosure relates to the field of biotechnology, and in particular to a method and apparatus for determining a pregnancy status of a pregnant woman and a corresponding method and apparatus for constructing a machine learning prediction model.

BACKGROUND

Since the discovery of cell-free DNAs (cfDNAs) in human plasma in 1948, it has been rapidly and widely used in the field of prenatal diagnosis, and non-invasive prenatal diagnosis based on data of cfDNAs in maternal plasma has become one of the important screening methods for fetal down syndrome. However, most of the applications based on data of cfDNAs in maternal plasma focus on the detection of fetal polyploidy and copy number variation. So far, there is no effective means of detecting pregnancy syndrome based on cfDNAs of pregnant women.

At present, the detection method of pregnancy syndrome based on cfDNAs in maternal plasma still needs to be developed.

SUMMARY

The present disclosure is based on the discovery and recognition by the inventors of the following facts and problems.

To date, the majority of clinical predictions of threatened premature delivery is completed by detecting fetal fibronectin secretion in the vagina of pregnant women. However, this method is only an auxiliary means, and cannot be used as the basis of final diagnosis. Currently, there is no effective diagnostic method for premature delivery.

There is a problem of high false-positive in the method of fetal fibronectin molecule-assisted diagnosis of premature delivery used clinically. Statistics show that in pregnant women diagnosed as positive by fetal fibronectin molecules, only less than 3% of the samples are finally determined as premature delivery. The problem of high false-positive makes this diagnostic method questionable.

Several reports have shown that fetal cfDNA concentration in maternal plasma is associated with various pregnancy complications, such as preeclampsia. Studies have attempted to predict premature delivery using fetal cfDNA concentration as a marker, but eventually failed due to insufficient correlation. So far, there is no effective method to predict premature delivery using fetal cfDNA concentration.

A previously reported method of predicting premature delivery using only a single factor of fetal cfDNA concentration had the problem of insufficient correlation, and failed to successfully establish an effective prediction model.

To this end, in a first aspect of the present disclosure, the present disclosure proposes a method for constructing a prediction model used for predicting a pregnancy status of a pregnant woman. According to an embodiment of the present disclosure, the method includes: step 1 of constructing a training set and an optional test set, the training set and the optional test set each consisting of a plurality of pregnant woman samples, the pregnant woman samples each having a known pregnancy status; step 2 of determining, for each pregnant woman sample in the training set, a predetermined parameter of the pregnant woman sample, the predetermined parameter including differentially expressed gene information of cell-free nucleic acids in peripheral blood of the pregnant woman sample, the differentially expressed gene information being obtained through calculation based on sequencing information of the cell-free nucleic acids in the peripheral blood of the pregnant woman sample; and step 3 of constructing the prediction model based on the known pregnancy status and the predetermined parameter. The method according to the embodiment of the present disclosure constructs a prediction model for a pregnancy status of a pregnant woman using differentially expressed gene information of cell-free nucleic acids and the pregnancy status of pregnant women (e.g. premature delivery, gestational age of delivery) obtained via one-time blood sampling for a plurality of pregnant woman samples. According to the method according to the embodiment of the present disclosure, the differentially expressed genes of cell-free nucleic acids in the peripheral blood of a pregnant woman are used to predict the pregnancy status, and different differentially expressed genes can be detected for different pregnancy statuses, such as premature delivery, preeclampsia, etc. Corresponding differential genes can be selected purposefully, thereby improving the accuracy of model prediction, and the prediction model can be constructed only by performing one-time blood sampling and sequencing for pregnant women. This method is convenient, fast, and highly accurate. The method is suitable for use in humans and other animals, such as mice, rats, rabbits, etc., and for use in scientific studies on the pathogenesis of pregnancy disorders, the pathogenesis of genetic diseases, and drug screening.

In a second aspect, the present disclosure provides a system for constructing a prediction model used for determining a pregnancy status of a pregnant woman. According to an embodiment of the present disclosure, the system includes: a training set construction module configured to construct a training set, the training set and an optional test set each consisting of a plurality of pregnant woman samples, each of the plurality of pregnant woman samples having a known pregnancy status; a predetermined parameter determination module connected to the training set construction module and configured to determine, for each pregnant woman sample in the training set, a predetermined parameter of the pregnant woman sample, the predetermined parameter including differentially expressed gene information of cell-free nucleic acids in plasma of the pregnant woman sample, the differentially expressed gene information being obtained through calculation based on sequencing information of free nucleic acids in peripheral blood of the pregnant woman sample; and a prediction model construction module connected to the predetermined parameter determination module and configured to construct the prediction model based on the known pregnancy status and the predetermined parameter. The system according to an embodiment of the present disclosure is adapted to perform the above-mentioned method for constructing a prediction model, which uses the differentially expressed genes of cell-free nucleic acids in the peripheral blood of pregnant women to predict the pregnancy status, Different differentially expressed genes can be detected for different pregnancy statuses, such as premature delivery, preeclampsia, etc. Corresponding differential genes can be selected purposefully, thereby improving the accuracy of model prediction, and the prediction model can be constructed only by performing one-time blood sampling and sequencing for pregnant women.

In a third aspect, the present disclosure provides a method for determining a pregnancy status of a pregnant woman. According to an embodiment of the present disclosure, the method includes: step 1 of determining a predetermined parameter of the pregnant woman, the predetermined parameter including expression prediction information of a premature delivery-related gene of the pregnant woman, the expression prediction information of the premature delivery-related gene being obtained through calculation based on sequencing information of cell-free nucleic acids in peripheral blood of the pregnant woman; and step 2 of determining the pregnancy status of the pregnant woman based on the predetermined parameter and a prediction model constructed with the method set forth in the first aspect of the present disclosure or the system set forth in the second aspect of the present disclosure. The method according to the embodiment of the present disclosure can predict the pregnancy status via only one-time blood sampling for the pregnant woman to be tested. The pregnancy status includes the probability of premature delivery, intrauterine growth retardation, preeclampsia and other pregnancy complications related to the cell-free nucleic acids in the maternal plasma. The method is simple and does not affect the life of the pregnant woman, the detection is accurate, and the operation is simple. The method is suitable for use in humans and other animals, such as mice, rats, rabbits, etc. and for use in scientific research on the pathogenesis of pregnancy disorders, the pathogenesis of genetic diseases, and drug screening.

In a fourth aspect, the present disclosure provides an apparatus for determining a pregnancy status of a pregnant woman. According to an embodiment of the present disclosure, the apparatus includes: a parameter determination module configured to determine a predetermined parameter of the pregnant woman, the predetermined parameter including expression prediction information of a premature delivery-related gene of the pregnant woman, the expression prediction information of the premature delivery-related gene being obtained through calculation based on sequencing information of cell-free nucleic acids in peripheral blood of the pregnant woman, and a pregnancy status determination module connected to the parameter determination module and configured to determine the pregnancy status of the pregnant woman based on the predetermined parameter and a prediction model constructed with the method set forth in the first aspect of the present disclosure or the system set forth in the second aspect of the present disclosure. The apparatus according to the embodiment of the present disclosure is adapted to carry out the method for determining a pregnancy status of a pregnant woman as described above, which can predict the pregnancy status via only one-time blood sampling for the pregnant woman to be tested. The pregnancy status includes the probability of premature delivery, intrauterine growth retardation, preeclampsia, and other pregnancy complications related to the cell-free nucleic acids in the maternal plasma.

In a fifth aspect of the present disclosure, the present disclosure provides a computer-readable storage medium having a computer program stored thereon. According to an embodiment of the present disclosure, the program, when executed by a processor, implements the steps for constructing a prediction model as described above. Thus, the above-described method for constructing a prediction model can be effectively implemented, so that the prediction model can be effectively constructed, and the prediction model can be further used to predict an unknown sample to determine the pregnancy status of the pregnant woman to be tested.

In a sixth aspect, the present disclosure provides an electronic device including the computer-readable storage medium as described above; and one or more processors configured to execute the program in the computer-readable storage medium.

Additional aspects and advantages of the present disclosure will be set forth in part in the description below and, in part, will be apparent from the description, or may be learned by practice of the present disclosure.

BRIEF DESCRIPTION OF DRAWINGS

The foregoing and/or additional aspects and advantages of the present disclosure will become apparent and readily appreciated from the following description of the embodiments, taken in conjunction with the accompanying drawings, in which.

DESCRIPTION OF EMBODIMENTS

Embodiments of the present disclosure will be described below, and examples of the embodiments are illustrated in the accompanying drawings. The embodiments described below with reference to the accompanying drawings are exemplary and are intended to be illustrative of the present disclosure and are not to be construed as limiting the present disclosure.

Term Interpretation

As used herein, the terms "first", "second", "third", and the like, unless specifically stated otherwise, are used for descriptive purposes to distinguish one from another and are not intended to imply or indicate that there is a difference in order, importance, or the like, and are not intended to imply that there is only one component in what is defined by the terms "first", "second", "third", and the like.

Figure 1:
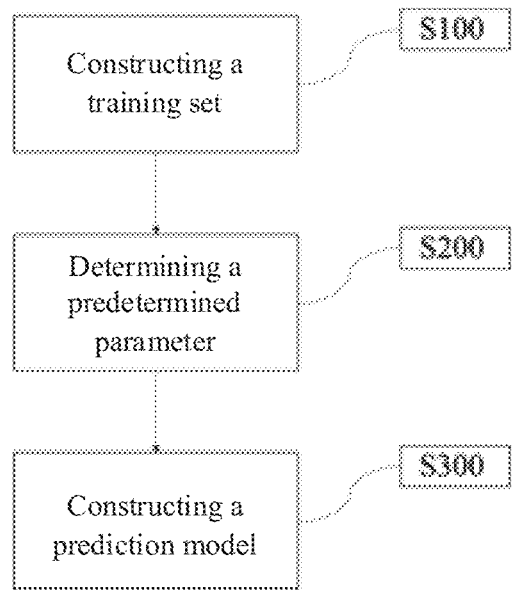
FIG. 1 is a schematic flow chart of a method for constructing a prediction model according to an embodiment of the present disclosure.

In a first aspect, the present disclosure provides a method for constructing a prediction model used for predicting a pregnancy status of a pregnant woman. According to an embodiment of the present disclosure, with reference to FIG. 1, the method includes: S100, constructing a training set and an optional test set, the training set and the optional test set each consisting of a plurality of pregnant woman samples, the pregnant woman samples each having a known pregnancy status; S200, determining, for each pregnant woman sample in the training set, a predetermined parameter of the pregnant woman sample, the predetermined parameter including differentially expressed gene information of cell-free nucleic acids in peripheral blood of the pregnant woman sample, the differentially expressed gene information being obtained through calculation based on sequencing information of the cell-free nucleic acids in the peripheral blood of the pregnant woman sample; and S300, constructing the prediction model based on the known pregnancy status and the predetermined parameter. The method according to a specific embodiment of the present disclosure constructs a prediction model for a pregnancy status of a pregnant woman using differentially expressed gene information of cell-free nucleic acids and the pregnancy status of the pregnant women (e.g. premature delivery, gestational age of delivery) obtained via one-time blood sampling for a plurality of pregnant woman samples. Pregnant women each having a known pregnancy status (such as premature delivery or full-term delivery) are selected as a training set or a verification set. The training set is used for construction of the model and adjustment of correlation coefficients, and the verification set is used for verification of an accuracy of the model; predetermined parameters of the pregnant woman sample in need are inputted into the model to obtain a prediction result; and the prediction result is compared with the pregnancy status of a corresponding pregnant woman sample in the test set so as to verify the accuracy of the model. During pregnancy, peripheral blood of the pregnant women is collected to obtain the cell-free nucleic acids in the peripheral blood of the pregnant woman sample, the cell-free nucleic acids are sequenced to obtain the sequencing information of the cell-free nucleic acids, then calculation and alignment are performed on the sequencing information of the cell-free nucleic acids to obtain the information of differentially expressed gene of the cell-free nucleic acids in the plasma of full-term pregnant women and premature pregnant women, and the model is constructed according to the information. It should be noted that in the embodiment of the present disclosure, the method for obtaining the cell-free nucleic acids in the maternal plasma is to collect the peripheral blood of the pregnant woman, which brings little trauma for the pregnant woman, and other methods can be used to obtain the cell-free nucleic acids in the maternal plasma. The cell-free nucleic acids in the maternal plasma can be DNAs or RNAs, and the cell-free nucleic acids in the maternal plasma include the cell-free nucleic acids of the pregnant woman herself and the cell-free nucleic acids of the fetus. It should be noted that the concentration of the fetal cell-free nucleic acids can also be used as the predetermined parameter for constructing the prediction model.

According to an embodiment of the present disclosure, the pregnancy status includes a delivery interval of the pregnant woman. According to the method of an embodiment of the present disclosure, when the delivery interval is not greater than a normal gestational age, it indicates a premature delivery. Furthermore, the method may be applied to other pregnancy complications associated with nucleic acid expression, such as tumors during pregnancy, preeclampsia, etc.

According to an embodiment of the present disclosure, the pregnant woman samples include premature pregnant woman samples and a full-term pregnant woman samples. According to the method of an embodiment of the present disclosure, a plurality of premature pregnant woman samples and a plurality of full-term pregnant woman samples are selected as a training set and a test set, respectively, to construct a premature delivery prediction model based on the differentially expressed genes of the cell-free nucleic acids in the plasma of the premature pregnant woman samples and the full-term pregnant woman samples, respectively. For different types of prediction, the differentially expressed genes of the cell-free nucleic acids are different. For different sample sizes, the differentially expressed genes of the cell-free nucleic acids are also different. For other types of prediction, such as pregnancy tumor and preeclampsia, the corresponding pregnant women with preeclampsia or pregnant women with pregnancy tumor and normal pregnant women are selected as samples to obtain their differentially expressed genes in cell-free nucleic acids and construct the corresponding prediction model. In the selection of pregnant woman samples, expanding the sample size helps to obtain more accurate differentially expressed genes and thus construct more accurate prediction models.

According to an embodiment of the present disclosure, a gestational age at which the samples are collected is 15 to 22 weeks. The inventors found that the differentially expressed gene of the cell-free nucleic acids in the maternal plasma collected at a gestational age of 15 to 22 weeks is strongly associated with premature delivery. Different pregnant woman samples only need to be collected once at a gestational age of 15 to 22 weeks to be used as the samples for model construction, thus avoiding the risks and costs of such repeated blood collections for pregnant women during sample collection. For different sampling gestational ages in week, the obtained differentially expressed genes of the cell-free nucleic acids are different, and for different types of prediction, the best blood sampling gestational ages in week used are also different.

According to an embodiment of the present disclosure, the prediction model is at least one of Principal Component Analysis or Random Forest. According to the method of an embodiment of the present disclosure, the prediction model is Principal Component Analysis or Random Forest. The prediction model is not limited to the Principal Component Analysis model and the Random Forest prediction model, and any statistical model that can generalize the different differential distributions is applicable.

Figure 2:
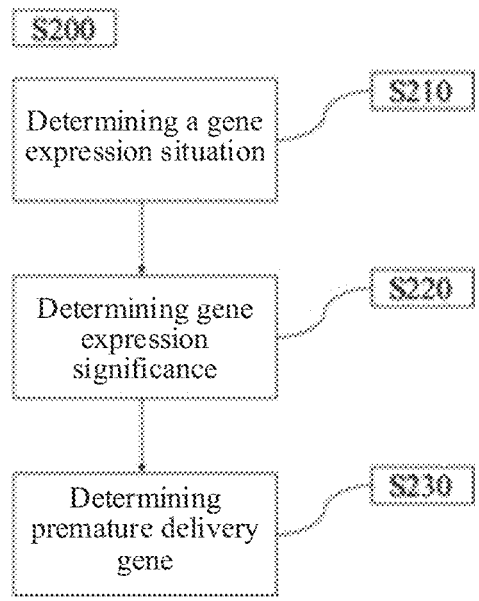
FIG. 2 is a schematic flow chart for obtaining differentially expressed gene information according to an embodiment of the present disclosure.

According to the method of an embodiment of the present disclosure, with reference to FIG. 2, the differentially expressed gene information is obtained by the following steps: S210, predicting a gene expression situation within the whole genome by using a coverage depth of sequencing reads of the cell-free nucleic acids in the peripheral blood of the pregnant woman sample at a gene transcription start site; S220, performing, for a vicinity of each gene transcription start site, significance detection on the coverage depth of the cell-free nucleic acids at each base site in the premature pregnant woman samples and the full-term pregnant woman samples; and S230, selecting, based on the significance detection, a significantly differentially expressed gene as a premature delivery-related gene, to construct a sequencing model, i.e. selecting a gene with p<0.05/a total number of genes as a premature delivery-related gene, so as to construct a sequencing model. According to an embodiment of the present disclosure, if the p value of a gene is less than the quotient of 0.05 divided by the total number of genes, then the gene is determined a differentially expressed gene; the criterion for the p value can also be a quotient of 0.01 divided by the total number of genes, i.e., a gene is determined as a differentially expressed gene if its p value is less than the quotient of 0.01 divided by the total number of genes. According to an embodiment of the present disclosure, the differentially expressed genes are related to the number of pregnant woman samples, the sequencing depth, and the type of prediction (i.e. prediction purpose), and different numbers of pregnant woman samples, different sequencing depths, different physiological states, and different detection purposes all affect the differentially expressed genes. The selection of differentially expressed genes is mainly based on the sequencing results and detection purposes when the model is constructed, and one gene or a combination of multiple genes may be selected.

Figure 3:
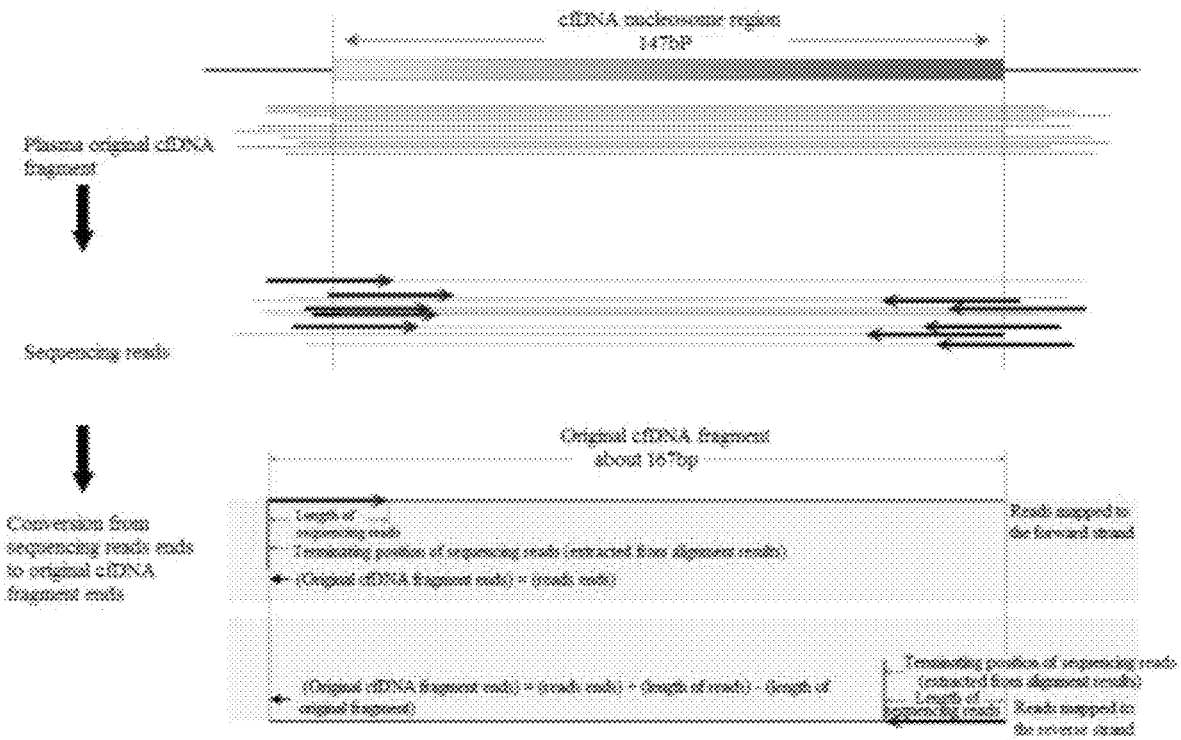
FIG. 3 is a schematic diagram of a method for converting sequencing reads ends to original cfDNA fragment ends in original alignment results according to an embodiment of the present disclosure.

According to a specific embodiment of the present disclosure, for each sample, the number of ends of the reads mapped to the forward strand and the reverse strand respectively at each base site in a vicinity of the transcription start site (TSS) of each gene within the whole genome is correspondingly converted to the number of ends of the original cfDNA fragment, with reference to FIG. 3. A sum of the ends of the corresponding covered cfDNA fragment at each base site after the conversion is the reads start count (RSC) at that site. For the vicinity of the TSS of each gene, significance test is performed on the RSC value at each base site for the premature delivery samples and full-term delivery samples (a general statistical monitoring method, e.g., wilcox rank sum test or T test, can be used), and the gene with significant difference (p<0.05/a total number of genes) is selected as the premature delivery-related gene for the subsequent construction of the prediction model. In addition to calculating the RSC value, other calculation methods can also be used to predict a nucleosome distribution, so as to determine the differentially expressed genes by using the nucleosome distribution information corresponding to the cell-free nucleic acids in the maternal plasma. Examples are the following two methods, i.e., windowed protection score (WPS) and relative coverage. Windowed protection score: a sliding window of a length of kbp (for 100 bp paired-end sequencing reads, k=120) is set within the whole genome; within each sliding window, WPS=(the number of DNA fragments completely covering this window—the number of reads with one end in the window); and on the basis of the determined WPS value at each site, peak calls are selected as the center position of the predicted nucleosome. Relative coverage: for paired-end sequencing cfDNA data, the coverage depth of the original cfDNA fragment at each site on the genome, i.e. relative coverage, can be calculated directly by filling in the middle part of each pair of paired sequencing reads, and finally the relative coverage is mapped to gene expression situation, so as to analyze the phenotype related to gene expression.

According to an embodiment of the present disclosure, the vicinity includes the transcription start site and 100 to 1000 bases respectively upstream and downstream of the transcription start site. According to an embodiment of the present disclosure, the vicinity includes the transcription start site and 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 bases respectively upstream and downstream of the transcription start site.

According to an embodiment of the present disclosure, the step S300 further includes: S310, inputting, as inputs for constructing the prediction model, a number of the plurality of pregnant woman samples, the pregnancy status of each of the plurality of pregnant woman samples, a volume of the premature delivery-related gene, a fragment length of the vicinity, and the coverage depth of the cell-free nucleic acids at each base site in the vicinity of the transcription start site of the premature delivery-related gene in the training set and the optional verification set.

According to a specific embodiment of the present disclosure, the premature delivery prediction model is constructed based on sequencing data of cell-free nucleic acids (cfDNAs) in maternal plasma, and the specific steps are as follows: (1) Previous data processing; after the quality control is completed for all the raw sequencing data (fq format) of the samples used for model training, prediction, and verification, the sequencing data is aligned onto the human reference chromosome using the alignment software (such as samse mode in BWA); the sequencing data quality control software (such as Picard) is used to remove the repeated reads in the alignment results and calculate a duplication rate, and mutation detection algorithm (such as the base quality score recalibration (BQSR) function in GATK) is used to complete the local correction of the alignment results: (2) Calculation of the reads start count in the regions of TSSz for a single sample: for each sample, in the vicinity of the transcription start site (TSS) of each gene within the whole genome (a range of 100 bp, 400 bp, 600 bp, or 1 kb respectively upstream and downstream of TSS is acceptable as the vicinity of TSS), the number of ends of reads mapped to the forward strand and the reverse strand respectively at each base site is correspondingly converted into the number of ends of the original cfDNA fragment; a sum of the ends of the corresponding covered cfDNA fragments at each base site after the conversion is the reads start count (RSC) at that site; (3) Selection of premature delivery-related gene: for the vicinity of TSS of each gene, significance test is performed on the RSC value at each base site for the premature delivery samples and full-term delivery samples (a general statistical monitoring method, e.g., wilcox rank sum test or T test, can be used), and the gene with significant difference (p<0.05/a total number of genes) is selected as the premature delivery-related gene for the subsequent construction of the prediction model; (4) construction of the premature delivery prediction model by taking the RSC value data in the regions of TSSs as an input matrix: the RSC result matrix at different base sites in the TSS region of the premature delivery-related gene obtained in (3) for the samples used for model training is used as the input to establish the prediction model, i.e., n samples correspond to each base site in the region of 1 kb upstream of and 1 kb downstream of the TSS of m premature delivery-related genes to calculate RSC, then an n×(m×2000) RSC matrix is obtained, and statistical software such as R is used for training the prediction model such as Principal Component Analysis (PCA) or Random Forest, and the finally obtained result is the prediction model.

According to an embodiment of the present disclosure, the premature delivery-related gene includes at least one selected from the genes shown in Table 1.

TABLE 1

Premature delivery-related genes

| Chromosome number | Starting position | Terminating position | Gene name |
|---|---|---|---|
| 1 | 6484647 | 6485047 | ESPN |
| 1 | 9294662 | 9295062 | H6PD |
| 1 | 22000000 | 22000000 | ALPL |
| 1 | 40000000 | 40000000 | MACF1 |
| 1 | 85000000 | 85000000 | PRKACB |
| 1 | 86000000 | 86000000 | CYR61 |
| 1 | 94000000 | 94000000 | MIR760 |
| 1 | 96000000 | 96000000 | TMEM56-RWDD3 |
| 1 | 110000000 | 110000000 | NBPF4 |
| 1 | 120000000 | 120000000 | CSDE1 |
| 1 | 150000000 | 150000000 | PEX11B |
| 1 | 150000000 | 150000000 | FCGR1C |
| 1 | 150000000 | 150000000 | RAB13 |
| 1 | 160000000 | 160000000 | VANGL2 |
| 1 | 170000000 | 170000000 | CACYBP |
| 1 | 200000000 | 200000000 | CAMSAP2 |
| 1 | 210000000 | 210000000 | PIGR |
| 1 | 220000000 | 220000000 | MARK1 |
| 1 | 220000000 | 220000000 | CAPN2 |
| 1 | 220000000 | 220000000 | DEGS1 |
| 1 | 230000000 | 230000000 | SLC35F3 |
| 1 | 240000000 | 240000000 | RYR2 |
| 2 | 11000000 | 11000000 | ATP6VIC2 |
| 2 | 27000000 | 27000000 | TMEM214 |
| 2 | 37000000 | 37000000 | CCDC75 |
| 2 | 44000000 | 44000000 | PPM1B |
| 2 | 55000000 | 55000000 | RPS27A |
| 2 | 61000000 | 61000000 | AHSA2 |
| 2 | 74000000 | 74000000 | BOLA3-AS1 |
| 2 | 88000000 | 88000000 | MIR4435-1 |
| 2 | 88000000 | 88000000 | MIR4435-2 |
| 2 | 140000000 | 140000000 | CCNT2 |
| 2 | 160000000 | 160000000 | ITGB6 |
| 2 | 170000000 | 170000000 | METAP1D |
| 2 | 200000000 | 200000000 | C2orf47 |
| 2 | 240000000 | 240000000 | RAMP1 |
| 2 | 240000000 | 240000000 | KLHL30 |
| 2 | 240000000 | 240000000 | TWIST2 |
| 3 | 14000000 | 14000000 | LOC100132526 |
| 3 | 34000000 | 34000000 | PDCD6IP |
| 3 | 58000000 | 58000000 | KCTD6 |
| 3 | 60000000 | 60000000 | FHIT |
| 3 | 130000000 | 130000000 | H1FX-AS1 |
| 3 | 140000000 | 140000000 | PRR23B |
| 3 | 180000000 | 180000000 | B3GNT5 |
| 4 | 980584 | 980984 | IDUA |
| 4 | 9269144 | 9269544 | LOC100287513 |
| 4 | 72000000 | 72000000 | MOB1B |
| 4 | 150000000 | 150000000 | MMAA |
| 4 | 190000000 | 190000000 | TLR3 |
| 5 | 56000000 | 56000000 | MAP3K1 |
| 5 | 69000000 | 69000000 | MARVELD2 |
| 5 | 69000000 | 69000000 | GTF2H2C |
| 5 | 69000000 | 69000000 | GTF2H2D |
| 5 | 71000000 | 71000000 | PMCHL2 |
| 5 | 74000000 | 74000000 | ANKRD31 |
| 5 | 91000000 | 91000000 | ARRDC3-AS1 |
| 5 | 120000000 | 120000000 | SNCAIP |
| 5 | 130000000 | 130000000 | C5orf56 |
| 5 | 140000000 | 140000000 | VTRNA2-1 |
| 5 | 140000000 | 140000000 | PSD2 |
| 5 | 140000000 | 140000000 | MIR3655 |
| 5 | 140000000 | 140000000 | PCDHGB7 |
| 5 | 150000000 | 150000000 | ABLIM |
| 5 | 180000000 | 180000000 | FAM153A |
| 6 | 291900 | 292300 | DUSP22 |
| 6 | 27000000 | 27000000 | HCG11 |
| 6 | 81000000 | 81000000 | C6orf7 |
| 6 | 120000000 | 120000000 | RFX6 |
| 6 | 140000000 | 140000000 | MYB |

TABLE 1-continued

Premature delivery-related genes

| Chromosome number | Starting position | Terminating position | Gene name |
|---|---|---|---|
| 6 | 170000000 | 170000000 | TCP10L2 |
| 7 | 6144349 | 6144749 | USP42 |
| 7 | 6793539 | 6793939 | RSPH10B2 |
| 7 | 17000000 | 17000000 | TSPAN13 |
| 7 | 33000000 | 33000000 | FKBP9 |
| 7 | 35000000 | 35000000 | DPY19L1 |
| 7 | 40000000 | 40000000 | C7orf10 |
| 7 | 49000000 | 49000000 | CDC14C |
| 7 | 63000000 | 63000000 | LOC100287834 |
| 7 | 64000000 | 64000000 | ZNF273 |
| 7 | 73000000 | 73000000 | NSUN5 |
| 7 | 75000000 | 75000000 | NSUN5P1 |
| 7 | 110000000 | 110000000 | HBP1 |
| 7 | 120000000 | 120000000 | ST7 |
| 7 | 130000000 | 130000000 | LRGUK |
| 7 | 140000000 | 140000000 | C7orf55 |
| 7 | 140000000 | 140000000 | FAM115C |
| 7 | 150000000 | 150000000 | CUL1 |
| 7 | 150000000 | 150000000 | ACTR3B |
| 8 | 9911629 | 9912029 | MSRA |
| 8 | 41000000 | 41000000 | GOLGA7 |
| 8 | 95000000 | 95000000 | FAM92A1 |
| 8 | 95000000 | 95000000 | PDP1 |
| 8 | 140000000 | 140000000 | BAI1 |
| 9 | 21000000 | 21000000 | IFNA8 |
| 9 | 110000000 | 110000000 | SMC2 |
| 9 | 140000000 | 140000000 | NTNG2 |
| 9 | 140000000 | 140000000 | CELP |
| 9 | 140000000 | 140000000 | SNORD24 |
| 9 | 140000000 | 140000000 | SURF2 |
| 9 | 140000000 | 140000000 | CACFD1 |
| 9 | 140000000 | 140000000 | LRRC26 |
| 10 | 51000000 | 51000000 | SLC18A3 |
| 10 | 61000000 | 61000000 | PHYHIPL |
| 10 | 65000000 | 65000000 | LOC84989 |
| 10 | 71000000 | 71000000 | C10orf35 |
| 10 | 73000000 | 73000000 | CDH23 |
| 10 | 74000000 | 74000000 | SPOCK2 |
| 10 | 82000000 | 82000000 | LOC642361 |
| 10 | 100000000 | 100000000 | CYP17A1 |
| 10 | 110000000 | 110000000 | SLK |
| 10 | 120000000 | 120000000 | TACC2 |
| 11 | 637104 | 637504 | DRD4 |
| 11 | 13000000 | 13000000 | ARNTL |
| 11 | 34000000 | 34000000 | NAT10 |
| 11 | 64000000 | 64000000 | MARK2 |
| 11 | 65000000 | 65000000 | SAC3D1 |
| 11 | 67000000 | 67000000 | KDM2A |
| 11 | 73000000 | 73000000 | ATG16L2 |
| 11 | 95000000 | 95000000 | ENDOD1 |
| 11 | 130000000 | 130000000 | TIRAP |
| 12 | 498315 | 498715 | CCDC77 |
| 12 | 3068547 | 3068947 | TEAD4 |
| 12 | 8850317 | 8850717 | RIMKLB |
| 12 | 12000000 | 12000000 | ETV6 |
| 12 | 53000000 | 53000000 | TENC1 |
| 12 | 77000000 | 77000000 | CSRP2 |
| 12 | 100000000 | 100000000 | CHST11 |
| 12 | 120000000 | 120000000 | CCDC62 |
| 13 | 46000000 | 46000000 | GTF2F2 |
| 14 | 51000000 | 51000000 | ATP5S |
| 14 | 59000000 | 59000000 | ACTR10 |
| 14 | 74000000 | 74000000 | ACOT4 |
| 14 | 96000000 | 96000000 | GLRX5 |
| 14 | 100000000 | 100000000 | ZNF839 |
| 14 | 110000000 | 110000000 | INF2 |
| 15 | 23000000 | 23000000 | MIR4509-3 |
| 15 | 27000000 | 27000000 | GABRG3 |
| 15 | 31000000 | 31000000 | CHRFAM7A |
| 15 | 33000000 | 33000000 | WHAMMP1 |
| 15 | 42000000 | 42000000 | RTF1 |
| 15 | 44000000 | 44000000 | STRC |
| 15 | 58000000 | 58000000 | CGNL1 |
| 15 | 63000000 | 63000000 | LACTB |
| 15 | 65000000 | 65000000 | ANKDD1A |

TABLE 1-continued

Premature delivery-related genes

| Chromosome number | Starting position | Terminating position | Gene name |
|---|---|---|---|
| 15 | 84000000 | 84000000 | SH3GL |
| 15 | 84000000 | 84000000 | ADAMTSL3 |
| 15 | 91000000 | 91000000 | CRTC3 |
| 15 | 100000000 | 100000000 | OR4F4 |
| 16 | 226478 | 226878 | HBA1 |
| 16 | 838421 | 838821 | CHTF18 |
| 16 | 1122555 | 1122955 | SSTR5 |
| 16 | 1290477 | 1290877 | TPSAB1 |
| 16 | 3070112 | 3070512 | TNFRSF12A |
| 16 | 3588835 | 3589235 | NLRC3 |
| 16 | 4475605 | 4476005 | DNAJA3 |
| 16 | 4743493 | 4743893 | NUDT16L1 |
| 16 | 22000000 | 22000000 | C16orf52 |
| 16 | 24000000 | 24000000 | PRKCB |
| 16 | 70000000 | 70000000 | CLEC18A |
| 16 | 74000000 | 74000000 | CLEC18B |
| 16 | 90000000 | 90000000 | C16orf55 |
| 17 | 37000000 | 37000000 | MIR4734 |
| 17 | 41000000 | 41000000 | AOC3 |
| 17 | 41000000 | 41000000 | RPL27 |
| 17 | 43000000 | 43000000 | FMNL1 |
| 17 | 44000000 | 44000000 | MIR4315-2 |
| 17 | 47000000 | 47000000 | ATP5G1 |
| 17 | 49000000 | 49000000 | ACSF2 |
| 17 | 49000000 | 49000000 | ABCC3 |
| 17 | 73000000 | 73000000 | SLC16A5 |
| 17 | 76000000 | 76000000 | SYNGR2 |
| 17 | 79000000 | 79000000 | CHMP6 |
| 17 | 81000000 | 81000000 | FN3K |
| 18 | 33000000 | 33000000 | ZNF397 |
| 18 | 55000000 | 55000000 | STSSIA3 |
| 18 | 68000000 | 68000000 | SOCS6 |
| 19 | 1000236 | 1000636 | GRIN3B |
| 19 | 1248351 | 1248751 | MIDN |
| 19 | 2819671 | 2820071 | ZNF554 |
| 19 | 5680575 | 5680975 | HSD11B1L |
| 19 | 20000000 | 20000000 | ZNF486 |
| 19 | 39000000 | 39000000 | ACTN4 |
| 19 | 46000000 | 46000000 | KLC3 |
| 19 | 46000000 | 46000000 | NANOS2 |
| 19 | 51000000 | 51000000 | SYT3 |
| 19 | 52000000 | 52000000 | CD33 |
| 19 | 58000000 | 58000000 | AURKC |
| 20 | 1206563 | 1206963 | RAD21L1 |
| 20 | 30000000 | 30000000 | HM13 |
| 20 | 37000000 | 37000000 | SLC32A1 |
| 20 | 49000000 | 49000000 | BCAS4 |
| 20 | 61000000 | 61000000 | GTPBPS |
| 21 | 22000000 | 22000000 | NCAM2 |
| 21 | 35000000 | 35000000 | IL10RB |
| 21 | 38000000 | 38000000 | DSCR6 |
| 21 | 38000000 | 38000000 | TTC3 |
| 21 | 44000000 | 44000000 | PDE9A |
| 21 | 46000000 | 46000000 | PFKL |
| 23 | 197860 | 198260 | PLCXD1 |
| 23 | 52000000 | 52000000 | XAGE2B |
| 23 | 70000000 | 70000000 | RAB41 |
| 23 | 100000000 | 100000000 | XKRX |
| 23 | 140000000 | 140000000 | LOC100129662 |
| 23 | 150000000 | 150000000 | MIR514A1 |
| 23 | 150000000 | 150000000 | FAM50A |
| 23 | 150000000 | 150000000 | LOC100507404 |

According to an embodiment of the present disclosure, the premature delivery-related genes are related to the number of pregnant woman samples and the sequencing depth, and the type and volume of the premature delivery-related gene may vary when different numbers of pregnant woman samples are used to construct the prediction model.

Figure 4:
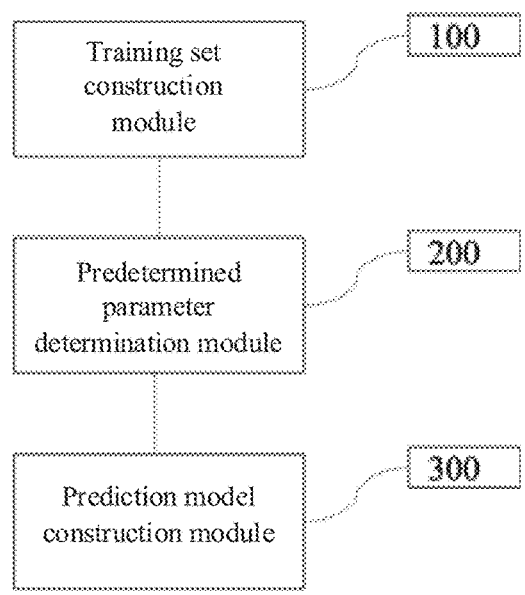
FIG. 4 is a schematic diagram of a system for constructing a prediction model according to an embodiment of the present disclosure.

In a second aspect, the present disclosure provides a system for constructing a prediction model used for determining a pregnancy status of a pregnant woman. According to an embodiment of the present disclosure, with reference to FIG. 4, the system includes: a training set construction module 100 configured to construct a training set, the training set and an optional test set each consisting of a plurality of pregnant woman samples, the pregnant woman samples each having a known pregnancy status; a predetermined parameter determination module 200 connected to the training set construction module 100 and configured to determine, for each pregnant woman sample in the training set, a predetermined parameter of the pregnant woman sample, the predetermined parameter including differentially expressed gene information of cell-free nucleic acids in plasma of the pregnant woman sample, the differentially expressed gene information being obtained through calculation based on sequencing information of cell-free nucleic acids in peripheral blood of the pregnant woman sample; and a prediction model construction module 300 connected to the predetermined parameter determination module 200 and configured to construct the prediction model based on the known pregnancy status and the predetermined parameter. According to a specific embodiment of the present disclosure, the system is adapted to perform the above-mentioned method for constructing the prediction model, and some of the additional technical features and technical effects thereof are the same as those previously described, and will not be described in detail herein.

Figure 5:
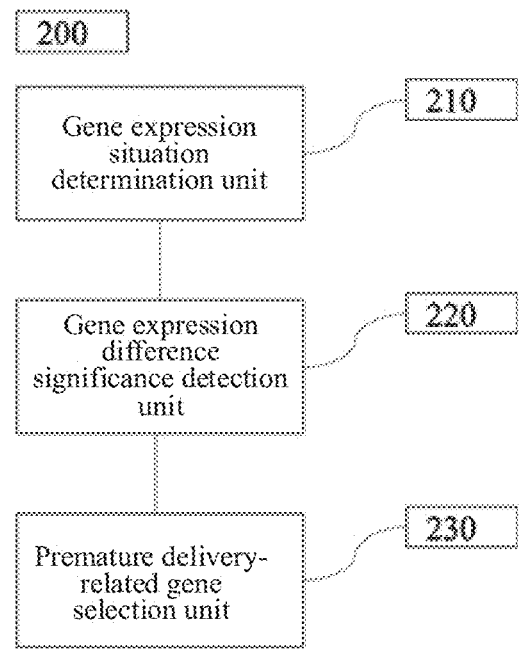
FIG. 5 is a schematic diagram of a predetermined parameter determination module according to an embodiment of the present disclosure.

According to an embodiment of the present disclosure, with reference to FIG. 5, the predetermined parameter determination module further includes: a gene expression situation determination unit 210, a gene expression difference significance detection unit 220, and a premature delivery-related gene selection unit 230. The gene expression situation determination unit 210 is configured to predict a gene expression situation within the whole genome by using a coverage depth of sequencing reads of the cell-free nucleic acids at a gene transcription start site in the peripheral blood of the pregnant woman sample. The gene expression difference significance detection unit 220 is connected to the gene expression situation determination unit 210 and configured to perform, for a vicinity of each gene transcription start site, significance detection on the coverage depth of the cell-free nucleic acids at each base site in the premature pregnant woman samples and the full-term pregnant woman samples. The premature delivery-related gene selection unit 230 is connected to the gene expression difference significance detection unit 220 and configured to select, based on the significance detection, a significantly differentially expressed genes as a premature delivery-related gene, i.e. selecting a gene with p<0.05/a total number of genes as a premature delivery-related gene, to construct a sequencing model. According to an embodiment of the present disclosure, if the p value of a gene is less than the quotient of 0.05 divided by the total number of genes, then the gene is determined as a differentially expressed gene; the criterion for the p value can also be the quotient of 0.01 divided by the total number of genes, i.e., a gene is determined as a differentially expressed gene if its p value is less than the quotient of 0.01 divided by the total number of genes. According to an embodiment of the present disclosure, the differentially expressed genes are related to the number of pregnant woman samples, the sequencing depth, and the type of prediction (i.e., prediction purpose), and different numbers of pregnant woman samples, different sequencing depths, different physiological states, and different detection purposes all affect the differentially expressed genes. The selection of differentially expressed genes is mainly based on the sequencing results and detection purposes w % ben the model is constructed, and one gene or a combination of multiple genes may be selected.

According to an embodiment of the present disclosure, the vicinity includes the transcription start site and 100 to 1000 bases respectively upstream and downstream of the transcription start site.

According to an embodiment of the present disclosure, the prediction model construction module 300 further includes: a data input unit 310 configured to input, as inputs for constructing the prediction model, a number of the plurality of pregnant woman samples, the pregnancy status of each of the plurality of pregnant woman samples, a volume of the premature delivery-related gene, a fragment length of the vicinity, and the coverage depth of the cell-free nucleic acids at each base site in the vicinity of the transcription start site of the premature delivery-related gene in the training set and the optional verification set.

According to an embodiment of the present disclosure, the premature delivery-related gene includes at least one selected from the genes shown in Table 1.

According to an embodiment of the present disclosure, the premature delivery-related gene is related to the number of pregnant woman samples and the sequencing depth, and the type and volume of the premature delivery-related gene may vary when different numbers of pregnant woman samples are used to construct the prediction model.

Figure 6:
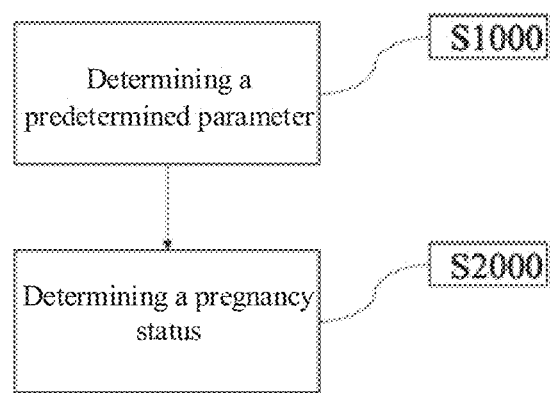
FIG. 6 is a schematic flow chart of a method for determining a pregnancy status of a pregnant woman according to an embodiment of the present disclosure.

In a third aspect, the present disclosure provides a method for determining a pregnancy status of a pregnant woman. According to an embodiment of the present disclosure, with reference to FIG. 6, the method includes: S1000, determining a predetermined parameter of the pregnant woman, the predetermined parameter including expression prediction information of a premature delivery-related gene of the pregnant woman, the expression prediction information of the premature delivery-related gene being obtained through calculation based on sequencing information of cell-free nucleic acids in peripheral blood of the pregnant woman; and S2000, determining the pregnancy status of the pregnant woman based on the predetermined parameter and a prediction model constructed with the method set forth in the first aspect of the present disclosure or the system set forth in the second aspect of the present disclosure. According to the method of the embodiment of the present disclosure, the cell-free nucleic acids in plasma of the pregnant woman to be tested are extracted and sequenced, the sequences of the cell-free nucleic acids in the plasma of the pregnant woman to be tested are analyzed according to the premature delivery-related gene obtained during the construction of the prediction model to obtain the expression prediction information of the premature delivery-related gene, and the expression information related to premature delivery is inputted into the prediction model to predict whether the pregnant woman will have premature delivery. For other types of prediction, such as pregnancy tumor and preeclampsia, corresponding prediction models and prediction model-related genes are used for prediction.

According to an embodiment of the present disclosure, the pregnancy status includes a delivery interval of the pregnant woman. According to the method of an embodiment of the present disclosure, when the delivery interval is not greater than a normal gestational age, it indicates a premature delivery. Furthermore, the method may be applied to other pregnancy complications associated with nucleic acid expression, such as pregnancy tumor, preeclampsia, etc.

According to an embodiment of the present disclosure, the gestational age at which the samples are collected is 15 to 22 weeks. The inventors found that the differentially expressed genes of the cell-free nucleic acids in maternal plasma collected at the gestational age of 15 to 22 weeks is strongly associated with premature delivery, and the pregnant woman to be tested only needs to undergo one-time blood collection at a gestational age of 15 to 22 weeks to complete the prediction of premature delivery, avoiding the risk and cost of such repeated blood collections for pregnant woman samples during the process of sample collection. For different sampling gestational ages in week, the obtained differentially expressed genes of the cell-free nucleic acids are different, and for different types of prediction, the best blood sampling gestational age in week used are also different.

According to an embodiment of the present disclosure, the prediction model is at least one of Principal Component Analysis or Random Forest. According to the method of an embodiment of the present disclosure, the prediction model is Principal Component Analysis or Random Forest. The prediction model is not limited to the Principal Component Analysis and the Random Forest, and any statistical model that can generalize the different differential distributions is applicable.

According to an embodiment of the present disclosure, the step S2000 further includes: S2100, inputting, for each pregnant woman sample to be tested, a volume of the premature delivery-related gene, a fragment length of the vicinity, and a coverage depth of the cell-free nucleic acids at each base site in a vicinity of a transcription start site of the premature delivery-related gene into the prediction model to obtain a prediction result.

According to a specific embodiment of the present disclosure, the sequencing data of the cell-free nucleic acids of the pregnant woman to be tested is taken. For each nucleic acid sample, an RSC value is calculated within a TSS region of the premature delivery-related gene. (m×2000) RSC values of each nucleic acid sample are taken as an input, and the prediction model is used for the prediction. Position coordinates (namely, an RSC matrix) of each obtained nucleic acid sample are mapped to a premature delivery region and a full-term delivery region, to predict whether the pregnant woman sample to be tested will have premature delivery.

The premature delivery-related gene includes at least one selected from the genes shown in Table 1.

According to an embodiment of the present disclosure, during the construction of the prediction model, the premature delivery-related gene is related to the number of pregnant woman samples and the sequencing depth, and the type and volume of the premature delivery-related gene may vary when different numbers of pregnant woman samples are used to construct the prediction model. In the detection of the pregnant women to be tested, the prediction is based on the premature delivery-related gene obtained in the construction of the prediction model.

Figure 7:
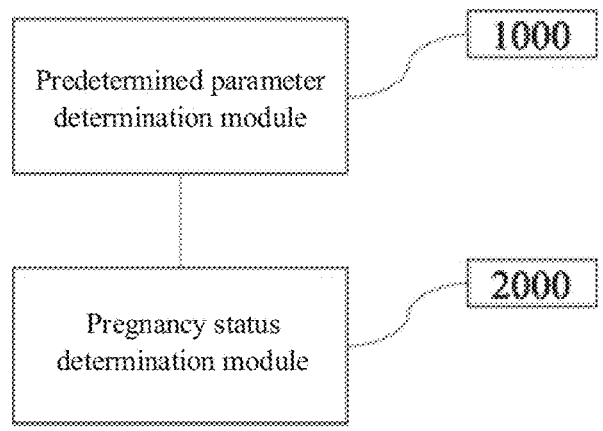
FIG. 7 is a schematic diagram of an apparatus for determining a pregnancy status of a pregnant woman according to an embodiment of the present disclosure.

In a fourth aspect, the present disclosure provides an apparatus for determining a pregnancy status of a pregnant woman. According to an embodiment of the present disclosure, with reference to FIG. 7, the apparatus includes: a predetermined parameter determination module 1000 configured to determine a predetermined parameter of the pregnant woman, the predetermined parameter including expression prediction information of a premature delivery-related gene of the pregnant woman, the expression prediction information of the premature delivery-related gene being obtained through calculation based on sequencing information of cell-free nucleic acids in peripheral blood of the pregnant woman; and a pregnancy status determination module 2000 connected to the predetermined parameter determination module 1000 and configured to determine the pregnancy status of the pregnant woman based on the predetermined parameter and a prediction model constructed with the method set forth in the first aspect of the present disclosure or the system set forth in the second aspect of the present disclosure. The apparatus according to an embodiment of the present disclosure is adapted to carry out the above-described method for determining a pregnancy status of a pregnant woman, some of the additional technical features and technical effects of which are the same as described above and will not be described in detail herein.

According to an embodiment of the present disclosure, the parameter determination module further includes: a premature delivery-related gene expression information determination unit 1100 configured to predict an expression situation of the premature delivery-related gene by using the coverage depth of sequencing reads of the cell-free nucleic acids at a gene transcription start site in the peripheral blood of the pregnant woman. The premature delivery-related gene is determined with the method as set forth in the first aspect of the present disclosure or the system as set forth in the second aspect of the present disclosure.

According to an embodiment of the present disclosure, the pregnancy status determination module further includes, a data input unit 2100 configured to input, for each pregnant woman sample to be tested, a volume of the premature delivery-related gene, a fragment length of the vicinity, and the coverage depth of the cell-free nucleic acids at each base site in the vicinity of the transcription start site of the premature delivery-related gene into the prediction model to obtain a prediction result.

According to a specific embodiment of the present disclosure, the sequencing data of the cell-free nucleic acids of the pregnant woman to be tested is taken. For each nucleic acid sample, an RSC value is calculated within a TSS region of the premature delivery-related gene. (m×2000) RSC values of each nucleic acid sample are taken as an input, and the prediction model is used for the prediction. Position coordinates (namely, an RSC matrix) of each obtained nucleic acid sample are mapped to a premature delivery region and a full-term delivery region, to predict whether the pregnant woman sample to be tested will have premature delivery.

According to an embodiment of the present disclosure, the premature delivery-related gene includes at least one selected from the genes shown in Table 1.

According to an embodiment of the present disclosure, during the construction of the prediction model, the premature delivery-related gene is related to the number of pregnant woman samples and the sequencing depth, and the type and volume of the premature delivery-related gene may vary when different numbers of pregnant woman samples are used to construct the prediction model. In the detection of the pregnant women to be tested, the prediction is based on the premature delivery-related gene obtained in the construction of the prediction model.

The implementation of the present disclosure will be explained with reference to the following examples. It will be understood by those skilled in the art that the following examples are merely illustrative of the present disclosure and are not to be construed as limiting the scope of the present disclosure. The reagents or instruments used, without indicating the manufacturer, are conventional products commercially available, e.g., from Illumina.

Figure 8:
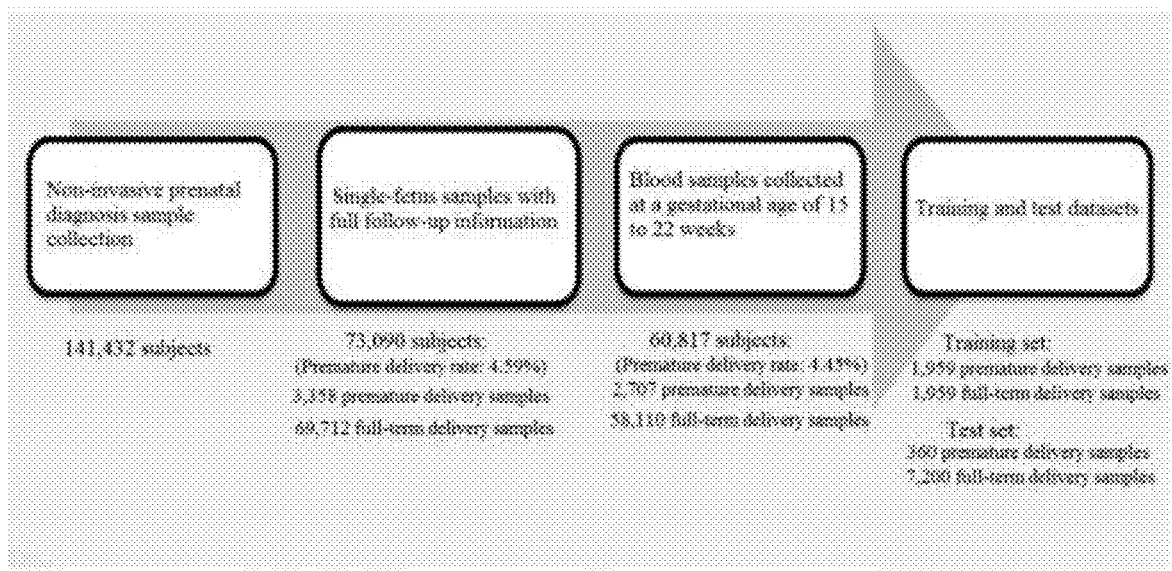
FIG. 8 is a sample screening flow of a training set and a test set for a premature delivery prediction model according to an embodiment of the present disclosure.

Example (1) Selecting from 141,432 non-invasive prenatal diagnosis (NIPT) samples, there were a total of 73,090 single-fetus samples with clinical information, including 3,358 premature delivery samples. After limiting the gestational age for blood collection within 15 to 22 weeks, there were 2,707 cases of premature delivery data remained. The samples data were divided into training set data including 1959 cases of premature delivery corresponding to 1959 cases of full-term delivery, and test set data consisting of remaining 360 cases of premature delivery and randomly selected 7200 cases of full-term delivery. Thus, a total of 1959 premature delivery samples and 1959 full-term delivery samples were determined for the training dataset for the premature delivery prediction model, and a total of 360 premature delivery samples and 7200 full-term delivery samples are determined for the test dataset. The sample screening process is illustrated with reference to FIG. 8.

The resulting samples of the training set and test set are shown in Table 2.

TABLE 2 summary of samples of training set and test set for premature delivery prediction

| Dataset | Sample group | Age Years (±standard deviation) | Sampling gestational age in week Gestational age in week (±standard deviation) | Gestational age in week at delivery Gestational age in week (±standard deviation) | Male fetus ratio (%) | Natural delivery rate (%) |
|---|---|---|---|---|---|---|
| Training set | Premature delivery (sample size = 1959) | 32.29 (±5.4) | 18.73 (±3.42) | 34.87 (±2.17) | 57.18 | 33.96 |
| | Full-term delivery (sample size = 1959) | 30.66 (±5.2) | 18.59 (±1.49) | 39.55 (±1.30) | 54.55 | 56.42 |
| Test set | Premature delivery (sample size = 360) | 31.98 (±5.4) | 18.56 (±3.32) | 34.45 (±2.22) | 54.72 | 36.22 |

TABLE 2-continued summary of samples of training set and test set for premature delivery prediction

| Dataset | Sample group | Age Years (±standard deviation) | Sampling gestational age in week Gestational age in week (±standard deviation) | Gestational age in week at delivery Gestational age in week (±standard deviation) | Male fetus ratio (%) | Natural delivery rate (%) |
|---|---|---|---|---|---|---|
| | Full-term delivery (sample size = 7200) | 31.08 (±5.3) | 18.49 (±1.58) | 39.78 (±1.45) | 50.88 | 41.27 |

(2) To ensure the accuracy of nucleosome distribution signal, the present example randomly aggregated every 10 people in the training set and test set into one data point, and finally converted about 0.1× of maternal plasma cfDNA whole genome sequencing data into about 1× of cfDNA whole genome sequencing data. In order to eliminate the error caused by the aggregation, this step was repeated randomly for 20 times, and the subsequent selection of significantly differential genes and construction of the prediction model were performed in parallel based on the dataset repeated randomly for 20 times.

(3) The RSC value between the premature delivery and full-term delivery samples in the above-mentioned training set was calculated in the vicinity of TSS of all the genes, and Wilcox rank sum test was performed on the RSC value between the premature delivery- and full-term delivery samples. In this example, this step was completed using the wilcox detection package of R statistical software. Finally, the significantly differential genes were selected from all the genes and used as input for subsequent model training. Considering the random error of repeated test, the selection criteria for significant difference of all 38,074 genes was $$p < \frac{0.05}{38074} \approx 1.31 \times 10^{-6}.$$

Finally, 207 genes with significant differences in RSC distribution among different vicinities of TSSs (here, 400 bp upstream and 400 bp downstream of TSS were selected as the vicinity of TSS) in premature delivery and full-term delivery samples are obtained. The wilcox rank sum test values of the 207 genes in each round are shown in Table 3. The P value for each gene were obtained after wilcox rank sum test in premature delivery group and full-term delivery group within 400 bp upstream and 400 bp downstream of TSS in each round under 20 rounds of independent analysis with the cross-verification method. If the P-value of a gene is lower than the threshold value of $1.31 \mathrm{e} 10^{-6}$ for more than 60% (12/20) rounds, the gene is considered to be a gene related to premature delivery. The serial number of chromosome where the gene is located a starting position, and a terminating position are shown in Table 1.

TABLE 3

Wilcox rank sum test values of 207 genes in each round

| Gene name | p values in 20 rounds of detection | Gene name | p values in 20 rounds of detection |
|---|---|---|---|
| ESPN | 2.2e−16; 1.753e−13; 1.678e−10; 7.674e−16; 7.763e−11; 1.278e−14; 7.111e−05; 2.643e−08; 8.437e−16; 7.896e−07; 1.664e−05; 4.497e−05; 2.272e−08; 0.279; 6.486e−07; 6.562e−09; 1.373e−09; 1.368e−07; 2.838e−06; 2.39e−11 | PHYHIPL | 0.0003654; 9.012e−14; 0.009747; 0.05962; 2.2e−16; 1.159e−06; 1.205e−06; 9.04e−13; 2.2e−16; 1.936e−10; 5.718e−08; 2.508e−08; 7.394e−11; 5.29e−09; 5.61e−06; 2.937e−08; 6.409e−16; 7.757e−11; 1.951e−10; 1.617e−07 |
| H6PD | 7.159e−07; 1.476e−05; 2.532e−07; 1.956e−06; 1.72e−08; 4.781e−07; 2.046e−06; 7.016e−09; 5.176e−09; 1.05e−08; 9.974e−08; 3.163e−11; 3.403e−10; 1.029e−05; 2.343e−08; 1.028e−08; 0.002638; 0.0005219; 2.944e−07; 6.259e−09 | LOC84989 | 1.953e−10; 2.312e−08; 1.296e−05; 4.39e−07; 8.518e−07; 0.0002043; 6.499e−07; 4.557e−09; 1.184e−05; 3.343e−07; 1.418e−07; 1.877e−07; 6.242e−09; 4.215e−08; 1.847e−08; 6.042e−07; 1.088e−06; 1.533e−06; 1.446e−05; 1.639e−05 |
| ALPL | 1.709e−06; 2.217e−05; 1.728e−09; 1.23e−10; 1.606e−07; 1.003e−10; 4.937e−08; 1.35e−06; 2.908e−06; 1.558e−10; 1.472e−09; 7.332e−09; 0.04088; 2.474e−06; 0.0003682; 2.113e−06; 2.2e−16; 3.041e−06; 6.406e−12; 3.241e−07 | C10orf35 | 0.0006212; 3.492e−07; 1.881e−09; 1.599e−08; 6.724e−09; 1.118e−05; 6.594e−08; 1.415e−11; 3.721e−13; 5.241e−12; 2.807e−13; 1.673e−10; 9.268e−11; 6.421e−15; 2.002e−10; 1.49e−11; 2.146e−13; 8.804e−11; 8.072e−11; 3.074e−08 |
| MACF1 | 1.464e−05; 5.003e−09; 4.233e−07; 1.954e−07; 1.363e−07; 0.0002071; 1.353e−08; 0.0007731; 1.123e−09; 9.031e−09; 1.136e−13; 3.769e−06; 4.608e−06; 3.138e−08; 1.394e−07; 1.414e−07; 8.703e−08; 9.527e−07; 7.852e−15; 0.0002961 | CDH23 | 6.715e−14; 2.2e−16; 2.007e−15; 2.424e−13; 2.2e−16; 4.268e−12; 2.2e−16; 8.234e−12; 1.12e−11; 1.129e−13; 4.11e−14; 7.23e−16; 7.132e−12; 2.2e−16; 1.163e−15; 2.2e−16; 1.793e−10; 2.606e−09; 1.221e−13; 8.26e−16 |

TABLE 3-continued

Wilcox rank sum test values of 207 genes in each round

| Gene name | p values in 20 rounds of detection | Gene name | p values in 20 rounds of detection |
| --- | --- | --- | --- |
| PRKACB | 1.477e−12; 1.027e−07; 2.973e−10; 1.99e−12; 8.445e−09; 4.237e−12; 5.873e−13; 2.2e−16; 5.721e−13; 8.8e−07; 2.747e−08; 2.588e−06; 2.075e−07; 4.263e−05; 0.0001338; 6.952e−12; 4.302e−09; 4.077e−12; 2.67e−13; 3.577e−06 | SPOCK2 | 1.32e−07; 1.84e−06; 9.106e−07; 5.443e−09; 0.0001697; 2.372e−07; 9.474e−07; 3.564e−09; 1.263e−07; 0.02342; 1.952e−08; 8.601e−05; 9.733e−06; 1.433e−06; 4.788e−08; 6.076e−07; 2.966e−06; 3.531e−08; 2.944e−05; 5.304e−06 |
| CYR61 | 1.225e−09; 8.294e−08; 1.067e−09; 3.262e−07; 3.866e−09; 6.328e−09; 4.199e−12; 5.277e−09; 1.71e−09; 7.77e−15; 1.213e−11; 3.281e−10; 0.0002497; 8.711e−12; 1.266e−08; 2.649e−12; 1.272e−08; 1.4e−08; 1.693e−12; 2.2e−16 | LOC642361 | 1.104e−08; 1.659e−09; 2.712e−06; 3.451e−09; 1.997e−10; 6.036e−11; 3.265e−08; 5.791e−09; 4.326e−10; 2.804e−10; 2.719e−07; 2.062e−10; 1.52e−11; 2.864e−09; 2.972e−09; 1.639e−11; 1.428e−07; 8.437e−09; 5.499e−08; 1.305e−09 |
| MIR760 | 2.2e−16; 7.09e−12; 1.5e−09; 9.841e−06; 1.821e−14; 9.176e−07; 3.137e−13; 7.436e−07; 1.86e−10; 3.745e−13; 1.576e−13; 1.717e−05; 3.896e−08; 2.104e−07; 2.2e−16; 2.311e−10; 6.075e−11; 3.585e−10; 1.666e−08; 3.859e−14 | CYP17A1 | 9.363e−06; 1.556e−06; 6.013e−09; 1.599e−06; 1.265e−06; 1.44e−06; 4.382e−09; 1.993e−12; 1.814e−07; 3.564e−06; 2.799e−09; 2.491e−08; 2.878e−09; 8.254e−08; 1.771e−07; 4.07e−07; 1.905e−07; 2.957e−07; 4.945e−07; 1.593e−08 |
| TMEMS6-RWDD3 | 9.35e−09; 0.0001825; 0.0004979; 1.29e−08; 5.718e−09; 2.179e−09; 2.783e−08; 1.028e−10; 3.912e−07; 6.379e−13; 1.064e−06; 0.0002715; 5.987e−08; 1.589e−07; 3.66e−10; 9.976e−09; 2.919e−06; 1.355e−09; 1.802e−09; 2.051e−11 | SLK | 2.302e−12; 2.921e−11; 1.996e−09; 1.904e−06; 2.931e−13; 4.461e−09; 7.51e−12; 1.622e−11; 2.927e−09; 2.487e−15; 1.653e−06; 1.365e−13; 1.008e−07; 5.535e−08; 3.221e−07; 2.942e−09; 3.306e−13; 1.554e−11; 6.276e−10; 2.596e−08 |
| NBPF4 | 4.327e−12; 1.31e−09; 8.665e−08; 9.858e−10; 1.06e−11; 4.102e−10; 4.222e−07; 4.84e−09; 5.608e−16; 2.7e−11; 8.789e−14; 5.609e−06; 1.241e−12; 1.967e−08; 3.544e−11; 3.067e−08; 1.838e−10; 1.988e−13; 6.32e−11; 3.107e−11 | TACC2 | 7.16e−08; 5.739e−08; 1.615e−11; 2.2e−16; 1.295e−12; 7.294e−10; 1.903e−09; 2.2e−16; 2.2e−16; 2.2e−16; 2.2e−16; 2.2e−16; 2.317e−07; 4.66e−16; 1.225e−12; 2.2e−16; 1.302e−10; 2.2e−16; 2.2e−16; 2.2e−16 |
| CSDE1 | 6.534e−05; 1.68e−07; 2.032e−07; 9.717e−08; 8.429e−07; 8.095e−11; 7.756e−08; 2.904e−06; 3.985e−05; 6.557e−07; 1.7e−11; 5.424e−06; 1.982e−06; 1.077e−06; 0.001961; 1.591e−08; 6.611e−05; 4.215e−08; 4.656e−08; 1.668e−08 | DRD4 | 3.478e−07; 3.308e−11; 0.1663; 2.2e−16; 2.081e−11; 1.341e−11; 3.633e−13; 6.784e−08; 7.006e−10; 2.727e−10; 4.169e−07; 2.119e−09; 4.905e−09; 0.004848; 0.01275; 1.559e−09; 5.029e−08; 1.477e−09; 1.209e−09; 2.2e−16 |
| PEX11B | 7.372e−06; 1.544e−09; 6.776e−05; 1.103e−05; 2.456e−13; 6.986e−10; 6.21e−09; 1.879e−08; 1.577e−10; 5.201e−07; 1.923e−09; 0.001264; 9.998e−12; 0.0002599; 4.23e−08; 6.487e−10; 0.00177; 8.405e−07; 1.31e−15; 1.053e−07 | ARNTL | 1.125e−07; 4.271e−07; 0.02749; 5.564e−07; 1.612e−12; 0.0001949; 7.918e−10; 0.008933; 8.328e−07; 0.0001798; 2.106e−07; 3.697e−08; 1.886e−11; 1.223e−06; 4.845e−09; 8.646e−12; 1.081e−12; 2.961e−13; 7.141e−12; 2.718e−05 |
| FCGR1C | 9.807e−15; 9.807e−15; 9.807e−15; 9.807e−15; 8.554e−06; 9.807e−15; 9.807e−15; 9.807e−15; 8.554e−06; 2.67e−10; NA; 9.807e−15; 9.807e−15; 9.807e−15; 9.807e−15; 9.807e−15; 8.554e−06; 9.807e−15; 9.807e−15; 9.807e−15 | NAT10 | 7.989e−10; 1.248e−06; 3.64e−09; 2.594e−10; 4.019e−07; 1.637e−06; 1.189e−10; 3.708e−07; 2.054e−08; 6.027e−13; 1.039e−07; 4.116e−09; 6.456e−08; 2.562e−09; 9.642e−10; 1.593e−08; 3.668e−08; 7.191e−08; 5.47e−10; 2.767e−06 |
| RAB13 | 4.076e−07; 5.32e−12; 1.071e−11; 7.942e−10; 1.352e−08; 1.818e−09; 3.05e−12; 0.0001068; 6.891e−06; 2.071e−08; 2.886e−08; 2.761e−13; 1.157e−10; 3.926e−11; 1.313e−06; 6.047e−10; 4.967e−12; 5.207e−08; 9.396e−11; 3.878e−13 | MARK2 | 1.38e−05; 1.721e−05; 2.004e−07; 1.474e−07; 5.692e−08; 8.771e−12; 5.775e−08; 2.28e−12; 4.52e−05; 8.969e−09; 7.602e−06; 1.226e−07; 8.498e−10; 0.0003584; 3.624e−07; 4.355e−07; 1.507e−09; 2.051e−07; 1.378e−05; 1.262e−08 |
| VANGL2 | 0.0002415; 4.297e−14; 3.132e−06; 2.2e−16; 5.25e−08; 4.645e−08; 0.0001497; 6.666e−08; 7.871e−10; 5.376e−08; 5.265e−11; 2.2e−16; 9.386e−09; 2.187e−09; 2.244e−10; 1.484e−09; 6.448e−06; 7.461e−07; 1.074e−12; 2.01e−09 | SAC3D1 | 7.114e−07; 5.304e−15; 5.56e−12; 0.0001339; 2.198e−15; 4.398e−11; 2.2e−16; 0.0001954; 7.964e−08; 4.745e−15; 5.769e−11; 1.071e−12; 2.2e−16; 4.469e−12; 7.089e−15; 0.0003347; 0.0001932; 6.856e−09; 2.2e−16; 7.963e−09 |
| CACYBP | 3.236e−07; 2.022e−06; 3.979e−07; 3.324e−06; 1.491e−06; 7.077e−08; 4.328e−11; 3.127e−07; 1.067e−08; 5.373e−10; 2.2e−16; 0.0005136; 8.825e−12; 5.332e−16; 0.0001084; | KDM2A | 1.745e−12; 2.2e−16; 6.339e−16; 2.2e−16; 7.212e−08; 2.2e−16; 4.053e−11; 3.166e−08; 3.485e−13; 8.755e−10; 6.735e−12; 4.978e−10; 1.749e−06; 2.2e−16; 7.562e−11; |

TABLE 3-continued

Wilcox rank sum test values of 207 genes in each round

| Gene name | p values in 20 rounds of detection | Gene name | p values in 20 rounds of detection |
|---|---|---|---|
| CAMSAP2 | 3.451e−06; 1.523e−06; 1.834e−09; 1.824e−06; 1.87e−12 2.2e−16; 6.419e−09; 4.159e−12; 2.2e−16; 2.2e−16; 8.509e−14; 2.729e−13; 1.1e−15; 1.043e−12; 2.2e−16; 4.007e−13; 2.2e−16; 3.525e−13; 1.012e−13; 2.585e−10; 2.2e−16; 4.752e−16; 5.689e−15; 2.2e−16; 5.437e−13 | ATG16L2 | 2.662e−08; 6.689e−06; 6.987e−14; 1.195e−07; 2.58e−07 1.76e−10; 6.675e−12; 4.571e−09; 3.095e−14; 8.36e−09; 6.973e−07; 8.951e−10; 2.565e−08; 1.854e−08; 1.422e−09; 2.2e−16; 6.984e−12; 3.683e−09; 3.016e−06; 1.866e−10; 9.588e−12; 1.431e−07; 7.4e−09; 1.369e−09; 2.556e−12 |
| PIGR | 4.59e−09; 8.227e−06; 3.969e−13; 5.99e−11; 3.026e−09; 2.524e−08; 1.21e−07; 6.214e−07; 1.921e−08; 2.379e−10; 1.84e−06; 6.731e−10; 2.356e−07; 8.365e−05; 1.323e−11; 1.008e−07; 3.273e−07; 4.461e−15; 1.094e−09; 1.641e−08 | ENDOD1 | 1.684e−14; 3.075e−13; 1.376e−11; 5.444e−05; 1.168e−11; 2.832e−05; 0.0001503; 3.086e−14; 2.2e−16; 2.373e−05; 2.2e−16; 7.153e−06; 2.2e−16; 4.567e−13; 7.713e−11; 1.402e−09; 1.695e−11; 0.0002168; 1.543e−08; 1.773e−07 |
| MARK1 | 2.417e−10; 5.358e−10; 3.54e−05; 1.79e−13; 6.954e−10; 6.571e−07; 2.2e−16; 1.871e−10; 1.977e−10; 2.89e−13; 1.673e−10; 6.556e−13; 2.2e−16; 1.347e−10; 7.377e−09; 1.811e−07; 1.19e−10; 8.186e−09; 2.2e−16; 2.556e−12 | TIRAP | 5.55e−13; 3.603e−13; 6.328e−07; 2.017e−14; 9.155e−08; 2.459e−10; 1.775e−09; 1.381e−08; 2.2e−16; 6.3e−15; 8.21e−13; 1.152e−07; 2.979e−07; 3.262e−12; 1.086e−08; 2.057e−14; 2.895e−06; 4.82e−11; 2.675e−06; 2.2e−16 |
| CAPN2 | 4.911e−09; 2.705e−08; 5.039e−11; 4.529e−06; 3.3e−05; 9.852e−10; 1.254e−12; 0.1995; 2.02e−06; 8.021e−08; 1.159e−08; 3.497e−13; 4.291e−05; 8.357e−07; 4.775e−09; 5.074e−05; 0.001393; 5.875e−07; 5.925e−07; 2.605e−08 | CCDC77 | 2.745e−07; 3.175e−11; 3.253e−05; 2.99e−05; 6.856e−05; 3.173e−06; 2.248e−09; 1.662e−08; 4.084e−09; 4.169e−07; 2.764e−14; 3.508e−11; 7.119e−10; 8.803e−09; 2.221e−14; 3.604e−07; 6.629e−13; 6.837e−13; 1.291e−07; 8.943e−05 |
| DEGS1 | 1.526e−08; 3.752e−08; 3.819e−14; 0.0015; 7.654e−08; 7.728e−12; 4.274e−15; 4.908e−08; 8.928e−12; 0.002809; 5.738e−10; 1.28e−14; 1.232e−10; 4.846e−08; 1.186e−09; 1.109e−09; 2.496e−14; 6.526e−11; 9.321e−11; 0.0001836 | TEAD4 | 6.861e−10; 2.978e−11; 8.107e−11; 4.808e−08; 1.67e−11; 6.971e−15; 1.825e−11; 1.055e−05; 8.186e−07; 3.359e−13; 4.211e−12; 1.135e−15; 8.585e−14; 8.646e−12; 1.146e−11; 2.355e−13; 3.846e−09; 8.421e−14; 0.003156; 5.417e−10 |
| SLC35F3 | 9.396e−10; 6.829e−09; 1.163e−07; 6.053e−09; 9.83e−16; 1.515e−11; 1.091e−07; 2.99e−09; 1.038e−08; 3.536e−13; 1.368e−09; 7.474e−14; 1.118e−07; 8.757e−10; 6.533e−11; 9.83e−07; 7.229e−10; 8.653e−10; 6.25e−09; 2.097e−11 | RIMKLB | 7.294e−10; 2.881e−09; 6.657e−06; 5.241e−12; 1.713e−08; 0.1423; 1.191e−06; 1.262e−07; 1.526e−09; 7.147e−11; 3.202e−08; 1.932e−12; 3.823e−08; 0.1708; 7.591e−08; 1.474e−06; 0.2148; 0.1453; 0.0003224; 2.204e−10 |
| RYR2 | 1.106e−12; 6.865e−07; 2.391e−12; 1.123e−10; 4.276e−05; 6.776e−12; 2.843e−08; 4.6e−14; 3.91e−13; 6.42e−08; 1.107e−11; 1.049e−12; 0.00373; 4.945e−08; 4.084e−06; 7.129e−05; 4.234e−14; 2.127e−09; 2.922e−08; 1.261e−15 | ETV6 | 5.417e−08; 1.135e−07; 8.99e−08; 6.658e−10; 0.00112; 3.193e−05; 1.019e−05; 1.155e−09; 1.342e−09; 5.875e−10; 3.815e−07; 0.03945; 0.004166; 2.287e−07; 1.697e−08; 6.737e−09; 7.051e−07; 4.448e−11; 0.007958; 2.661e−08 |
| ATP6V1C2 | 9.371e−06; 1.213e−09; 9.959e−06; 7.169e−07; 2.283e−06; 9.073e−10; 4.04e−10; 4.137e−07; 3.512e−14; 4.828e−10; 2.442e−07; 4.266e−08; 1.233e−09; 2.049e−06; 2.37e−08; 1.81e−07; 6.837e−09; 1.593e−11; 2.2e−16; 6.109e−07 | TENC1 | 2.17e−05; 5.689e−09; 6.715e−10; 5.242e−11; 3.218e−07; 1.067e−05; 5.698e−08; 1.797e−07; 2.977e−11; 1.481e−07; 5.676e−09; 6.616e−06; 5.5e−08; 1.153e−08; 2.124e−1.034e−07; 9.512e−05; 2.549e−08 |
| TMEM214 | 7.226e−11; 5.14e−08; 7.117e−06; 5.403e−11; 7.384e−10; 2.225e−10; 1.277e−05; 2.985e−08; 1.599e−09; 4.102e−07; 9.629e−08; 3.308e−09; 5.856e−06; 1.408e−08; 2.655e−07; 5.778e−07; 5.373e−07; 3.552e−10; 1.098e−11; 2.473e−07 | CSRP2 | 6.828e−07; 1.654e−06; 2.216e−08; 2.038e−11; 9.715e−11; 4.512e−08; 4.639e−08; 6.592e−11; 1.295e−06; 1.424e−05; 9.248e−07; 2.082e−07; 3.475e−05; 0.0002081; 7.954e−11; 5.772e−07; 3.217e−08; 9.77e−09; 1.441e−09; 5.241e−08 |
| CCDC75 | 4.902e−10; 1.166e−10; 3.179e−06; 0.000315; 2.686e−12; 2.258e−07; 1.755e−06; 3.794e−10; 3.575e−09; 7.233e−07; 0.0001642; 0.00322; 3.372e−12; 6.544e−12; 1.463e−07; 2.576e−08; 9.101e−08; 0.0005515; 1.564e−10; 7.387e−08 | CHST11 | 1.296e−11; 3.47e−09; 1.559e−14; 1.479e−08; 9.234e−10; 2.258e−08; 2.644e−13; 3.587e−05; 2.467e−07; 6.476e−08; 4.392e−09; 5.701e−12; 2.057e−14; 1.406e−15; 4.056e−07; 1.723e−11; 4.472e−09; 2.122e−13; 2.603e−08; 1.559e−13 |
| PPM1B | 1.465e−08; 1.4e−07; 4.358e−06; 2.821e−12; 5.495e−08; 2.439e−12; 7.111e−09; 4.955e−11; 2.266e−08; | CCDC62 | 1.035e−08; 1.198e−07; 0.002075; 2.777e−09; 2.336e−13; 2.968e−07; 2.148e−13; 1.457e−08; 1.358e−09; |

TABLE 3-continued

Wilcox rank sum test values of 207 genes in each round

| Gene name | p values in 20 rounds of detection | Gene name | p values in 20 rounds of detection |
|---|---|---|---|
| | 9.92e−09; 1.875e−11; 1.133e−07; 2.593e−09; 2.647e−05; 1.065e−12; 1.718e−13; 2.486e−09; 3.278e−10; 2.127e−12; 6.788e−05 | | 2.325e−07; 5.793e−06; 3.523e−11; 6.104e−12; 0.0001775; 0.0002667; 8.253e−12; 1.627e−11; 9.027e−15; 2.651e−08; 1.004e−09 |
| RPS27A | 6.457e−12; 3.499e−05; 1.318e−07; 2.251e−11; 2.2e−16; 2.221e−11; 2.526e−14; 0.0002087; 3.678e−12; 3.852e−10; 2.949e−10; 1.342e−09; 6.806e−10; 1.513e−08; 1.923e−13; 3.49e−08; 4.912e−11; 4.129e−14; 7.618e−10; 7.437e−14 | GTF2F2 | 1.397e−07; 2.481e−07; 6.211e−07; 3.94e−08; 2.744e−08; 1.064e−07; 1.205e−08; 0.09699; 2.787e−13; 1.64e−06; 1.126e−05; 1.474e−07; 1.773e−09; 6.899e−15; 1.81e−07; 9.703e−09; 6.343e−08; 0.007297; 2.464e−05; 5.752e−07 |
| AHSA2 | 1.791e−07; 7.325e−11; 1.13e−10; 3.442e−09; 9.684e−14; 5.923e−09; 2.2e−16; 2.2e−16; 1.163e−11; 6.547e−12; 4.177e−11; 6.51e−16; 4.192e−15; 9.026e−15; 2.197e−09; 1.466e−05; 5.602e−09; 8.816e−11; 2.373e−10; 5.173e−12 | ATP5S | 3.719e−06; 2.258e−15; 2.629e−08; 7.757e−06; 7.85e−15; 7.121e−09; 4.8e−07; 1.029e−09; 2.851e−05; 1.644e−11; 1.198e−05; 5.568e−08; 3.395e−12; 1.574e−06; 2.809e−10; 5.123e−10; 2.332e−06; 1.832e−06; 3.89e−07; 7.468e−06 |
| BOLA3-AS1 | 1.886e−05; 0.0005824; 1.241e−10; 2.318e−13; 2.651e−10; 3.258e−09; 3.622e−12; 1.661e−09; 7.613e−07; 1.129e−07; 5.192e−10; 2.066e−11; 1.888e−05; 6.254e−07; 7.575e−09; 5.09e−10; 0.02401; 5.508e−08; 5.33e−05; 1.359e−07 | ACTR10 | 5.853e−12; 2.2e−16; 5.129e−10; 3.103e−09; 8.14e−14; 2.2e−16; 2.972e−06; 6.418e−10; 2.872e−16; 5.42e−10; 8.909e−07; 8.343e−11; 1.668e−08; 3.95e−10; 3.273e−08; 8.303e−15; 4.109e−07; 5.132e−16; 1.618e−11; 8.487e−09 |
| MIR4435-1 | 3.81e−08; 0.001635; 3.81e−08; 3.81e−08; 0.468; 0.001635; 3.81e−08; 3.81e−08; 3.81e−08; 2.67e−10; 3.81e−08; 3.81e−08; 0.468; 3.81e−08; 3.81e−08; 9.807e−15; 0.468; 3.81e−08; 3.81e−08; 3.81e−08 | ACOT4 | 2.075e−06; 2.037e−07; 1.841e−05; 9.67e−08; 2.387e−06; 9.057e−10; 3.438e−09; 1.161e−09; 1.077e−05; 1.072e−08; 3.497e−11; 3.987e−10; 1.248e−10; 1.254e−06; 5.938e−08; 1.204e−09; 1.494e−08; 2.454e−08; 1.151e−08; 7.228e−05 |
| MIR4435-2 | 3.81e−08; 0.001635; 3.81e−08; 3.81e−08; 0.468; 0.001635; 3.81e−08; 3.81e−08; 3.81e−08; 2.67e−10; 3.81e−08; 3.81e−08; 0.468; 3.81e−08; 3.81e−08; 9.807e−15; 0.468; 3.81e−08; 3.81e−08; 3.81e−08 | GLRX5 | 3.349e−13; 2.134e−15; 5.797e−15; 8.09e−09; 2.329e−13; 3.182e−10; 4.173e−11; 6.703e−13; 1.038e−12; 2e−15; 1.283e−13; 7.491e−11; 1.098e−06; 2.2e−16; 1.4e−10; 2.2e−16; 1.24e−05; 2.363e−15; 2.176e−07; 2.972e−14 |
| CCNT2 | 5.823e−07; 2.174e−06; 3.419e−06; 1.321e−05; 8.231e−07; 2.349e−07; 7.864e−05; 2.997e−06; 1.399e−09; 3.594e−09; 8.821e−09; 1.204e−08; 6.14e−07; 0.5695; 9.724e−12; 7.81e−10; 1.49e−08; 5.913e−10; 9.047e−07; 6.241e−11 | ZNF839 | 0.0001525; 1.896e−08; 0.001747; 3.867e−11; 3.359e−11; 7.898e−14; 1.202e−13; 4.144e−10; 1.816e−13; 2.925e−09; 3.693e−13; 2.21e−12; 1.123e−15; 7.021e−10; 2.445e−10; 5.247e−10; 3.103e−08; 1.274e−10; 3.502e−13; 1.956e−12 |
| ITGB6 | 8.242e−09; 3.998e−10; 9.498e−10; 2.275e−08; 2.213e−10; 2.433e−08; 9.761e−08; 1.282e−08; 7.514e−09; 1.41e−07; 2.663e−07; 2.842e−10; 1.275e−11; 4.788e−08; 2.063e−10; 8.44e−13; 1.676e−07; 5.768e−13; 1.24e−07; 1.051e−13 | INF2 | 1.303e−06; 2.539e−05; 1.776e−05; 6.089e−07; 4.514e−13; 1.667e−11; 1.347e−04; 4.132e−09; 4.739e−14; 1.506e−11; 2.24e−07; 2.098e−08; 1.181e−09; 2.2e−16; 2.261e−10; 3.229e−06; 4.05e−07; 2.361e−07; 3.311e−07; 2.884e−09 |
| METAP1D | 3.627e−12; 7.819e−11; 8.562e−16; 4.747e−14; 2.2e−16; 2.2e−16; 2.2e−16; 2.629e−10; 2.2e−16; 9.222e−13; 2.911e−09; 2.2e−16; 2.159e−08; 6.91e−12; 1.572e−13; 2.2e−16; 3.923e−14; 3.209e−08; 9.571e−13; 2.2e−16 | MIR4509-3 | 2.652e−13; 2.031e−14; 3.125e−06; 0.002124; 2.2e−16; 6.764e−11; 5.35e−11; 7.362e−11; 5.792e−08; 3.361e−15; 9.686e−06; 0.003712; 0.1708; 0.2323; 5.569e−12; 1.213e−12; 3.95e−09; 6.765e−16; 1.04e−10; 3.934e−08 |
| C2orf47 | 7.043e−07; 3.805e−09; 1.399e−09; 1.831e−05; 6.996e−07; 1.194e−05; 2.715e−06; 1.381e−08; 7.114e−07; 0.001714; 3.592e−08; 0.001206; 7.911e−09; 5.901e−08; 1.624e−07; 7.164e−11; 2.758e−06; 7.152e−06; 7.801e−07; 1.284e−06 | GABRG3 | 3.477e−07; 1.287e−08; 6.153e−06; 3.908e−07; 3.742e−07; 2.439e−09; 3.168e−06; 8.529e−07; 3.524e−10; 2.889e−09; 1.403e−05; 2.049e−08; 1.949e−12; 1.933e−09; 1.129e−07; 4.105e−11; 1.909e−06; 8.977e−14; 5.555e−15; 6.704e−10 |
| RAMP1 | 2.2e−16; 1.324e−14; 2.2e−16; 4.752e−16; 2.2e−16; 1.656e−14; 1.001e−11; 2.535e−07; 1.263e−08; 1.482e−10; 6.629e−06; 2.535e−12; 2.2e−16; 3.219e−16; 6.738e−06; 1.33e−12; 1.459e−14; 2.872e−15; 5.702e−13; 7.389e−06 | CHRFAM7A | 2.67e−10; 2.67e−10; NA; 2.67e−10; 2.67e−10; NA; 2.67e−10; NA; 2.67e−10; 2.67e−10; 2.67e−10; 2.67e−10; 2.67e−10; 2.67e−10; 2.67e−10; 2.67e−10; 2.67e−10; 2.67e−10; 2.67e−10; 2.67e−10 |

TABLE 3-continued

Wilcox rank sum test values of 207 genes in each round

| Gene name | p values in 20 rounds of detection | Gene name | p values in 20 rounds of detection |
|---|---|---|---|
| KLHL30 | 2.078e−12; 5.894e−12; 1.427e−10; 3.807e−08; 9.072e−09; 1.907e−10; 4.225e−10; 3.678e−09; 2.163e−06; 1.651e−07; 2.225e−07; 5.819e−07; 1.031e−06; 1.193e−08; 4.005e−12; 1.317e−06; 2.286e−10; 3.187e−10; 0.0001337; 1.439e−10 | WHAMMP1 | 1.455e−10; 3.895e−05; 7.228e−09; 6.101e−11; 1.566e−05; 5.088e−07; 5.928e−10; 1.685e−07; 8.517e−07; 2.964e−09; 3.495e−08; 3.777e−07; 0.0002092; 1.794e−09; 1.832e−06; 1.053e−12; 2.105e−11; 2.851e−06; 2.996e−05; 0.00037 |
| TWIST2 | 6.424e−14; 5.894e−08; 4.656e−11; 5.804e−07; 1.426e−12; 1.989e−08; 1.001e−06; 1.478e−10; 2.2e−16; 2.949e−16; 1.124e−06; 2.628e−09; 2.2e−16; 6.033e−06; 3.501e−15; 4.523e−06; 3.275e−07; 1.202e−10; 1.102e−11; 2.73e−10 | RTF1 | 0.0007047; 0.0004056; 8.44e−12; 2.2e−16; 3.729e−06; 9.886e−13; 2.243e−07; 1.709e−11; 3.684e−07; 1.78e−07; 0.004304; 1.788e−06; 1.759e−08; 1.169e−07; 4.966e−07; 3.781e−13; 8.161e−10; 7.742e−14; 0.0001192; 0.0001687 |
| LOC100132526 | 1.802e−12; 1.135e−11; 1.296e−15; 3.935e−05; 1.766e−14; 5.721e−13; 3.82e−10; 2.749e−13; 9.139e−12; 7.676e−06; 3.013e−11; 5.675e−11; 3.909e−12; 5.753e−08; 2.746e−11; 5.679e−12; 2.059e−08; 4.249e−11; 1.291e−09; 7.939e−10 | STRC | 1.05e−08; 9.708e−09; 0.005677; 1.475e−08; 1.475e−08; 9.708e−09; 0.005677; 1.05e−08; 1.475e−08; 4.913e−08; 4.913e−08; 1.475e−08; 1.368e−08; 1.05e−08; 1.475e−08; 4.913e−08; 0.005677; 1.475e−08; 1.05e−08; 1.475e−08 |
| PDCD6IP | 9.349e−16; 1.421e−10; 2.2e−16; 2.2e−16; 8.792e−11; 2.2e−16; 5.846e−16; 2.699e−15; 6.628e−14; 2.2e−16; 7.062e−11; 7.944e−15; 3.675e−10; 2.582e−12; 4.137e−16; 3.977e−15; 1.009e−14; 3.603e−15; 5.265e−14; 7.42e−13 | CGNL1 | 2.415e−12; 8.374e−13; 6.715e−12; 3.708e−15; 4.386e−13; 1.629e−08; 3.533e−11; 2.2e−16; 2.2e−16; 2.547e−09; 2.35e−12; 2.897e−13; 4.753e−14; 7.078e−13; 4.484e−08; 7.512e−11; 3.236e−11; 1.367e−10; 2.959e−14; 3.473e−08 |
| KCTD6 | 6.456e−12; 3.035e−12; 3.562e−13; 6.561e−06; 2.2e−16; 2.401e−12; 0.08307; 0.0001162; 7.164e−09; 7.93e−16; 3.119e−09; 1.404e−15; 1.18e−12; 2.2e−16; 0.001922; 2.32e−13; 5.546e−13; 5.466e−13; 1.791e−14; 5.541e−06 | LACTB | 1.006e−09; 1.226e−07; 4.551e−12; 2.2e−16; 7.911e−14; 2.251e−14; 3.064e−09; 4.415e−12; 9.692e−16; 1.459e−13; 3.695e−07; 5.545e−10; 3.419e−12; 5.012e−15; 3.098e−13; 2.2e−16; 1.847e−07; 1.717e−12; 6.514e−10; 2.781e−16 |
| FHIT | 1.419e−11; 4.258e−09; 5.266e−11; 1.417e−08; 1.476e−10; 4.855e−11; 3.838e−10; 6.062e−07; 4.073e−09; 8.679e−09; 9.775e−09; 3.371e−08; 1.675e−09; 1.916e−09; 4.742e−06; 8.283e−13; 1.87e−07; 1.13e−10; 6.08e−15; 2.055e−09 | ANKDD1A | 2.2e−16; 2.413e−10; 9.013e−06; 1.915e−06; 1.385e−07; 0.01798; 8.153e−10; 1.586e−05; 1.881e−08; 0.001041; 7.331e−11; 2.771e−08; 2.876e−08; 2.2e−16; 1.393e−07; 1.11e−08; 6.477e−09; 2.2e−16; 5.64e−10; 1.093e−10 |
| HIFX-AS1 | 5.128e−10; 3.922e−08; 1.435e−10; 9.177e−06; 3.014e−10; 1.844e−09; 8.092e−10; 1.067e−09; 7.87e−08; 2.154e−08; 1.739e−09; 5.186e−06; 7.881e−09; 4.183e−07; 1.883e−05; 4.895e−10; 1.153e−06; 1.021e−11; 4.158e−08; 7.831e−09 | SH3GL3 | 4.647e−07; 1.68e−06; 1.496e−06; 3.681e−08; 4.811e−08; 3.048e−08; 6.843e−07; 9.398e−09; 0.0002916; 1.089e−10; 3.157e−14; 2.257e−11; 5.012e−11; 1.385e−06; 2.664e−07; 5.351e−10; 1.544e−05; 3.352e−14; 8.104e−06; 7.012e−10 |
| PRR23B | 8.189e−09; 1.462e−06; 6.163e−11; 9.465e−06; 1.48e−06; 3.646e−07; 9.666e−06; 3.527e−08; 2.271e−07; 7.787e−07; 2.026e−09; 5.371e−08; 2.513e−07; 1.028e−08; 8.563e−09; 1.47e−10; 2.003e−10; 1.173e−06; 1.986e−05; 2.905e−08 | ADAMTSL3 | 5.932e−10; 2.085e−10; 2.272e−11; 3.058e−13; 1.399e−09; 7.187e−10; 9.372e−10; 1.978e−09; 1.632e−08; 8.211e−09; 3.011e−07; 8.095e−11; 4.257e−11; 4.016e−09; 9.316e−11; 1.068e−09; 5.735e−05; 8.034e−09; 2.332e−11; 3.283e−10 |
| B3GNT5 | 1.06e−07; 1.905e−15; 5.497e−06; 4.013e−16; 2.854e−07; 4.591e−13; 1.437e−09; 2.986e−11; 1.691e−15; 2.266e−10; 1.557e−06; 4.016e−06; 3.232e−07; 1.356e−10; 4.019e−08; 9.007e−08; 3.402e−10; 8.617e−07; 1.206e−10; 2.431e−07 | CRTC3 | 5.091e−09; 3.663e−15; 8.629e−10; 0.001448; 2.2e−16; 5.975e−09; 1.994e−07; 2.2e−07; 1.734e−07; 1.218e−10; 1.821e−09; 5.915e−09; 0.0002324; 5.456e−11; 4.917e−12; 3.113e−14; 1.076e−12; 1.151e−06; 1.267e−08; 0.02202 |
| IDUA | 9.663e−07; 5.926e−10; 1.199e−06; 2.816e−08; 5.564e−07; 0.002383; 4.751e−11; 8.477e−09; 1.593e−06; 2.106e−08; 2.212e−05; 3.597e−07; 5.902e−10; 9.78e−13; 1.377e−08; 8.087e−07; 5.048e−05; 4.482e−10; 1.527e−10; 6.797e−07 | OR4F4 | 5.644e−13; 4.196e−13; 4.226e−12; 4.029e−11; 1.718e−12; 8.309e−11; 0.6899; 1.551e−13; 2.2e−16; 8.732e−13; 4.979e−12; 2.2e−16; 2.135e−13; 2.2e−16; 3.677e−08; 1.972e−14; 3.591e−16; 2.658e−06; 4.7e−16; 3.949e−06 |
| LOC100287513 | 7.802e−08; 2.081e−06; 1.999e−06; 7.912e−10; 2.481e−06; 5.117e−09; 5.175e−06; 8.264e−08; 1.678e−06; 1.658e−06; 3.104e−07; 3.575e−07; 0.002582; 3.932e−10; 3.692e−09; | HBA1 | 2.67e−10; 2.67e−10; NA; 2.67e−10; 2.67e−10; 2.67e−10; 2.67e−10; NA; 2.67e−10; NA; NA; 2.67e−10; 2.67e−10; 2.67e−10; 2.67e−10; |

TABLE 3-continued

Wilcox rank sum test values of 207 genes in each round

| Gene name | p values in 20 rounds of detection | Gene name | p values in 20 rounds of detection |
|---|---|---|---|
| MOB1B | 1.15e−06; 1.501e−06; 0.0001286; 0.000195; 0.0009762 1.069e−08; 9.039e−08; 2.015e−13; 1.019e−08; 1.652e−09; 1.644e−07; 7.889e−05; 7.738e−05; 4.094e−07; 3.192e−09; 0.001063; 4.173e−05; 3.121e−10; 7.798e−07; 1.331e−11; 8.114e−07; 2.75e−06; 1.897e−08; 6.535e−06; 3.971e−06 | CHTF18 | 2.67e−10; 2.67e−10; 2.67e−10; 2.67e−10; NA 0.003008; 1.91e−12; 3.51e−11; 3.215e−06; 3.544e−16; 8.374e−13; 3.51e−10; 1.094e−09; 3.938e−14; 1.123e−05; 2.272e−07; 0.0001944; 7.397e−08; 3.538e−09; 6.362e−08; 1.124e−05; 0.0003143; 9.737e−09; 2.743e−10; 2.122e−07 |
| MMAA | 2.306e−08; 5.523e−08; 4.348e−13; 4.522e−16; 4.986e−14; 1.993e−05; 4.386e−09; 7.507e−12; 4.443e−13; 9.854e−11; 1.921e−09; 1.529e−06; 6.908e−10; 1.661e−09; 4.574e−09; 3.894e−11; 1.956e−11; 2.852e−12; 7.216e−11; 4.092e−11 | SSTR5 | 7.249e−07; 1.623e−05; 5.62e−11; 2.944e−14; 2.115e−10; 4.511e−06; 4.422e−12; 5.883e−09; 3.611e−09; 1.171e−06; 2.841e−07; 2.412e−09; 9.176e−14; 2.817e−08; 3.534e−09; 1.023e−14; 8.787e−09; 8.419e−05; 7.394e−10; 5.623e−09 |
| TLR3 | 2.037e−09; 2.982e−11; 8.201e−11; 8.742e−07; 2.333e−07; 2.217e−09; 9.893e−11; 2.066e−11; 3.571e−10; 9.907e−11; 3.471e−11; 9.39e−13; 3.096e−06; 5.991e−07; 3.796e−10; 4.781e−08; 5.847e−14; 9e−10; 1.79e−10; 9.29e−09 | TPSAB1 | NA; 2.67e−10; 2.67e−10; 2.67e−10; NA; 2.67e−10; 2.67e−10; 2.67e−10; 2.67e−10; 2.67e−10; NA; 2.67e−10; 2.67e−10; 2.67e−10; 2.67e−10; 2.67e−10; 2.67e−10; 2.67e−10; 2.67e−10; 2.67e−10 |
| MAP3K1 | 6.231e−08; 2.006e−08; 2.505e−12; 2.243e−05; 6.846e−09; 5.623e−06; 3.227e−10; 1.544e−11; 8.042e−07; 1.405e−05; 0.0003028; 4.107e−07; 7.332e−13; 6.841e−06; 1.625e−06; 0.001813; 5.155e−07; 4.684e−10; 2.723e−08; 2.882e−06 | TNFRSF12A | 0.002302; 8.217e−07; 8.918e−12; 1.493e−10; 2.307e−09; 1.623e−06; 0.08386; 1.25e−07; 6.298e−09; 1.033e−09; 5.824e−08; 5.539e−12; 2.436e−13; 1.605e−09; 0.09084; 0.0001127; 1.766e−05; 1.535e−13; 3.331e−05; 1.049e−11 |
| MARVELD2 | 1.6e−06; 1.019e−09; 1.024e−10; 1.729e−06; 9.169e−08; 8.315e−06; 1.955e−08; 3.638e−08; 4.864e−05; 3.317e−06; 3.738e−07; 6.428e−08; 6.258e−07; 5.582e−06; 2.822e−07; 1.558e−05; 1.814e−06; 1.512e−09; 3.425e−09; 2.109e−07 | NLRC3 | 4.071e−06; 4.341e−09; 5.474e−06; 2.044e−07; 5.097e−07; 6.385e−07; 1.598e−07; 1.359e−07; 8.108e−08; 1.106e−07; 3.927e−08; 1.058e−09; 3.789e−10; 1.918e−07; 1.696e−05; 4.43e−05; 5.424e−09; 1.682e−07; 4.161e−07; 5.068e−07 |
| GTF2H2C | 3.621e−09; 3.621e−09; 3.343e−09; 3.621e−09; 1.247e−10; 1.247e−10; 1.247e−10; 3.621e−09; 6.28e−08; 3.62e−09; 8.546e−09; 1.247e−10; 3.341e−09; 0.3607; 3.342e−09; 0.3607; 0.3607; 0.3607; 3.62e−09; 3.621e−09 | DNAJA3 | 1.736e−07; 1.078e−07; 3.713e−08; 1.665e−06; 8.082e−07; 1.733e−09; 8.393e−08; 7.746e−06; 1.663e−09; 3.048e−06; 6.172e−06; 3.416e−10; 1.168e−05; 9.176e−08; 1.123e−10; 3.273e−07; 1.079e−05; 5.86e−09; 9.386e−09; 3.693e−05 |
| GTF2H2D | 6.28e−08; 6.28e−08; 6.28e−08; 6.28e−08; 2.67e−10; 2.67e−10; 2.67e−10; 6.28e−08; 6.28e−08; 6.28e−08; 6.28e−08; 2.67e−10; 6.28e−08; 8.554e−06; 6.28e−08; 8.554e−06; 8.554e−06; 8.554e−06; 6.28e−08; 6.28e−08 | NUDT16L1 | 2.282e−16; 1.737e−08; 5.096e−10; 5.219e−13; 7.74e−11; 8.065e−12; 3.512e−12; 8.905e−11; 2.2e−16; 7.099e−10; 9.188e−13; 3.621e−14; 2.379e−09; 5.157e−09; 1.161e−13; 6.127e−10; 8.308e−13; 3.292e−07; 5.259e−13; 1.811e−09 |
| PMCHL2 | 8.389e−05; 2.206e−12; 1.804e−13; 2.826e−09; 2.016e−08; 3.616e−12; 1.2e−09; 6.243e−08; 1.846e−10; 2.76e−07; 8.707e−05; 5.97e−07; 1.821e−05; 2.267e−12; 9.534e−08; 4.021e−05; 0.0003259; 2.425e−09; 5.65e−06; 3.443e−09 | C16orf52 | 1.049e−09; 2.546e−06; 4.496e−06; 2.476e−06; 2.533e−08; 3.065e−07; 1.218e−10; 2.047e−12; 1.253e−09; 1.169e−08; 5.967e−10; 3.3e−07; 5.234e−10; 4.831e−16; 2.267e−08; 1.641e−05; 1.09e−10; 3.872e−07; 5.643e−12; 1.324e−13 |
| ANKRD31 | 1.295e−06; 7.223e−08; 4.267e−05; 2.626e−11; 9.156e−07; 8.62e−07; 7.893e−07; 9.475e−07; 2.257e−06; 1.536e−06; 7.29e−09; 9.744e−09; 6.069e−07; 3.184e−09; 4.229e−06; 2.807e−10; 2.462e−08; 7.891e−06; 3.263e−06; 1.178e−05 | PRKCB | 6.131e−05; 0.004651; 5.001e−08; 4.548e−08; 1.011e−06; 1.853e−09; 1.329e−08; 5.061e−07; 3.621e−07; 0.009203; 3.859e−14; 3.376e−10; 5.819e−08; 5.37e−09; 1.157e−06; 0.00382; 2.686e−07; 3.923e−10; 1.021e−12; 1.639e−08 |
| ARRDC3-AS1 | 5.167e−08; 2.673e−10; 2.976e−14; 2.2e−16; 5.172e−15; 2.2e−16; 3.057e−16; 8.186e−11; 5.401e−09; 2.2e−16; 2.412e−11; 1.413e−14; 2.622e−15; 7.809e−15; 7.496e−15; 1.217e−13; 6.267e−14; 1.417e−15; 2.2e−16; 4.451e−07 | CLEC18A | 1.028e−08; 6.502e−06; 1.028e−08; 1.028e−08; 1.028e−08; 1.028e−08; 6.502e−06; 1.028e−08; 6.502e−06; 1.028e−08; 1.247e−09; 6.502e−06; 1.028e−08; 1.247e−09; 8.554e−06; 1.028e−08; 1.028e−08; 1.028e−08; 1.028e−08; 8.554e−06 |
| SNCAIP | 1.668e−06; 4.068e−07; 6.161e−11; 2.208e−05; 4.458e−11; 0.000183; 6.235e−07; 8.645e−10; 3.229e−16; | CLEC18B | 2.2e−16; 2.2e−16; 2.2e−16; 2.2e−16; 2.2e−16; 2.67e−10; 2.67e−10; 2.67e−10; 2.2e−16; |

TABLE 3-continued

Wilcox rank sum test values of 207 genes in each round

| Gene name | p values in 20 rounds of detection | Gene name | p values in 20 rounds of detection |
|---|---|---|---|
|  | 0.0003347; 4.528e−12; 1.622e−10; 2.486e−06; 4.818e−08; 3.689e−05; 0.0007001; 1.983e−07; 6.254e−08; 5.273e−10; 2.723e−11 |  | 2.2e−16; 2.2e−16; 2.67e−10; 2.2e−16; 2.2e−16; 2.2e−16; 2.2e−16; 2.2e−16; 2.2e−16; 2.2e−16; 2.2e−16 |
| C5orf56 | 1.159e−07; 3.615e−15; 2.2e−16; 1.087e−12; 1.333e−11; 2.2e−16; 6.496e−15; 4.609e−11; 1.898e−15; 9.145e−10; 4.632e−09; 5.154e−06; 2.595e−07; 2.759e−14; 1.864e−07; 2.2e−16; 2.811e−14; 1.452e−11; 1.667e−06; 7.168e−13 | C16orf55 | 3.137e−08; 3.772e−09; 6.385e−16; 1.494e−08; 7.722e−12; 9.869e−09; 1.538e−09; 0.01321; 9.057e−12; 7.182e−08; 1.044e−09; 0.005692; 9.895e−10; 1.182e−06; 7.194e−09; 5.446e−07; 5.071e−12; 6.48e−12; 2.708e−12; 2.262e−16 |
| VTRNA2-1 | 7.031e−06; 1.151e−06; 3.965e−07; 9.309e−07; 2.287e−07; 3.684e−07; 7.829e−05; 1.072e−05; 1.532e−07; 4.156e−10; 3.984e−09; 8.542e−09; 3.377e−07; 7.806e−12; 2.955e−08; 2.061e−06; 3.13e−10; 2.086e−06; 3.261e−08; 3.203e−09 | MIR4734 | 1.523e−14; 1.202e−12; 2.77e−12; 1.395e−10; 5.903e−12; 8.453e−13; 2.032e−08; 1.988e−10; 1.277e−13; 4.782e−09; 1.193e−14; 7.09e−10; 2.2e−16; 2.805e−16; 2.2e−16; 1.492e−13; 7.112e−15; 5.809e−10; 2.2e−16; 7.408e−12 |
| PSD2 | 7.376e−05; 0.0008298; 2.894e−07; 6.739e−07; 0.0002328; 2.182e−10; 1.093e−08; 2.582e−07; 5.492e−11; 2.2e−16; 3.886e−15; 4.62e−10; 5.735e−08; 9.157e−07; 1.861e−10; 0.0001193; 3.708e−11; 2.2e−16; 1.099e−06; 4.356e−05 | AOC3 | 6.717e−06; 9.868e−06; 6.523e−09; 1.407e−06; 2.468e−08; 5.393e−07; 8.709e−09; 1.118e−05; 0.002463; 1.13e−07; 1.362e−05; 8.649e−07; 6.553e−10; 6.561e−06; 4.703e−08; 1.505e−06; 2.181e−08; 1.193e−08; 1.239e−06; 7.391e−09 |
| MIR3655 | 6.178e−08; 0.0003719; 4.692e−09; 4.848e−10; 2.263e−10; 1.96e−09; 0.0001635; 2.502e−08; 7.577e−10; 1.317e−09; 2.812e−07; 8.264e−10; 2.514e−05; 3.324e−05; 7.164e−11; 3.347e−09; 8.098e−08; 2.204e−07; 3.029e−08; 1.551e−08 | RPL27 | 2.662e−09; 2.386e−08; 1.171e−06; 3.126e−06; 3.387e−11; 0.0006645; 2.334e−15; 0.0001039; 2.937e−12; 5.701e−07; 4.062e−06; 5.869e−14; 2.616e−11; 1.501e−11; 4.003e−08; 1.615e−05; 0.004885; 5.271e−15; 2.525e−07; 4.406e−14 |
| PCDHGB7 | 1.027e−08; 2.219e−08; 1.83e−06; 5.476e−07; 7.285e−07; 6.883e−08; 6.531e−07; 4.293e−07; 4.78e−06; 1.801e−06; 4.897e−09; 2.944e−08; 6.62e−11; 1.792e−08; 1.491e−07; 1.913e−09; 5.137e−09; 6.438e−05; 1.863e−05; 2.275e−08 | FMNL1 | 5.915e−11; 7.682e−06; 8.524e−11; 1.058e−08; 3.516e−07; 8.084e−07; 1.761e−09; 2.303e−05; 3.451e−07; 1.905e−07; 6.296e−06; 8.283e−07; 0.007107; 0.005834; 2.122e−11; 8.645e−07; 2.222e−06; 1.166e−09; 5.558e−07; 3.882e−09 |
| ABLIM3 | 7.606e−13; 5.286e−09; 8.391e−09; 1.01e−08; 6.143e−15; 3.264e−09; 1.129e−12; 5.707e−10; 2.401e−11; 3.842e−10; 5.683e−11; 4.753e−13; 8.231e−07; 3.621e−05; 2.097e−11; 2.2e−16; 2.185e−15; 4.773e−07; 2.078e−09; 3.522e−10 | MIR4315-2 | 2.2e−16; 2.67e−10; 2.2e−16; 2.2e−16; 2.67e−10; 2.2e−16; 2.2e−16; 2.2e−16; 2.67e−10; 2.2e−16; 2.67e−10; 2.67e−10; 2.67e−10; 2.2e−16; 2.2e−16; 2.2e−16; NA; 2.2e−16; 2.2e−16; 2.2e−16 |
| FAM153A | 1.656e−06; 0.000158; 5.008e−06; 2.555e−09; 1.969e−09; 9.558e−09; 6.878e−10; 0.0001566; 1.193e−11; 1.702e−05; 2.404e−08; 5.336e−09; 6.889e−05; 1.295e−06; 3.759e−09; 1.954e−08; 3.922e−07; 1.584e−05; 7.066e−09; 4.132e−11 | ATP5G1 | 1.671e−12; 3.156e−10; 3.388e−14; 2.521e−13; 3.827e−14; 5.329e−10; 1.532e−13; 9.965e−11; 2.57e−12; 2.442e−14; 8.405e−12; 6.504e−13; 2.245e−12; 1.087e−08; 3.221e−14; 2.2e−16; 9.987e−10; 1.883e−13; 2.2e−16; 2.713e−15 |
| DUSP22 | 2.2e−16; 9.316e−12; 1.319e−11; 4.381e−12; 6.495e−11; 2.2e−16; 5.307e−09; 0.001016; 2.201e−12; 1.651e−06; 6.584e−12; 3.068e−05; 4.173e−08; 4.568e−08; 2.2e−16; 1.437e−10; 1.915e−12; 5.422e−08; 3.319e−16; 2.247e−11 | ACSF2 | 2.607e−14; 1.633e−12; 1.958e−07; 3.065e−10; 1.483e−07; 1.115e−06; 2.2e−16; 3.412e−11; 1.319e−15; 0.0001351; 2.121e−11; 6.025e−11; 7.736e−12; 0.001147; 7.51e−08; 1.49e−08; 8.251e−15; 1.301e−09; 1.09e−07; 3.428e−08 |
| HCG11 | 3.158e−08; 1.565e−06; 7.247e−08; 2.735e−08; 9.275e−13; 4.422e−09; 1.854e−11; 5.029e−07; 1.153e−09; 1.768e−07; 9.025e−08; 1.152e−10; 5.403e−09; 5.889e−07; 1.515e−11; 2.38e−09; 0.0001129; 1.078e−08; 9.841e−13; 3.658e−05 | ABCC3 | 5.329e−12; 9.716e−07; 3.777e−07; 2.2e−16; 2.691e−14; 7.749e−08; 4.553e−09; 7.078e−13; 4.191e−07; 1.757e−11; 1.285e−09; 2.2e−16; 1.58e−09; 9.354e−06; 2.956e−10; 5.58e−11; 1.348e−07; 6.582e−07; 3.55e−14; 1.482e−09 |
| C6orf7 | 0.000121; 6.511e−09; 9.25e−11; 2.916e−08; 2.547e−09; 7.765e−08; 1.061e−06; 1.266e−06; 2.724e−11; 7.203e−08; 1.783e−07; 0.0009854; 2.496e−10; 0.0008202; 2.098e−09; 7.588e−11; 2.309e−08; 2.831e−08; 6.82e−06; 4.595e−11 | SLC16A5 | 2.658e−08; 2.436e−13; 9.63e−06; 2.848e−10; 1.001e−12; 2.957e−07; 0.0003856; 8.471e−11; 6.089e−07; 1.036e−05; 2.943e−13; 1.58e−12; 1.733e−12; 2.314e−13; 2.329e−13; 2.606e−13; 0.004875; 2.531e−15; 4.714e−14; 6.399e−10 |

TABLE 3-continued

Wilcox rank sum test values of 207 genes in each round

| Gene name | p values in 20 rounds of detection | Gene name | p values in 20 rounds of detection |
|---|---|---|---|
| RFX6 | 2.425e−09; 5.205e−11; 1.598e−07; 2.189e−07; 5.535e−05; 4.882e−08; 4.851e−12; 2.37e−07; 0.0005546; 4.878e−09; 5.458e−06; 6.89e−06; 2.306e−09; 9.397e−08; 1.599e−08; 2.728e−08; 2.255e−07; 1.507e−07; 8.699e−08; 4.557e−08 | SYNGR2 | 3.653e−07; 3.107e−10; 1.416e−09; 3.008e−08; 2.013e−12; 7.379e−09; 1.017e−08; 1.325e−09; 3.319e−07; 5.082e−12; 1.064e−09; 1.754e−08; 2.013e−09; 1.675e−08; 8.4e−11; 2.071e−08; 3.293e−10; 1.416e−08; 1.33e−10; 2.125e−05 |
| MYB | 2.759e−08; 3.543e−07; 4.459e−07; 9.972e−10; 0.002327; 9.346e−10; 0.0001704; 1.464e−06; 2.409e−07; 9.247e−09; 2.757e−07; 1.04e−06; 1.064e−08; 4.35e−08; 4.556e−06; 3.946e−05; 1.525e−06; 0.0003768; 1.219e−06; 1.093e−05 | CHMP6 | 9.622e−08; 1.331e−14; 9.245e−13; 3.716e−07; 8.906e−07; 9.888e−06; 1.01e−07; 1.944e−09; 1.607e−08; 1.568e−06; 1.496e−09; 3.313e−09; 1.13e−08; 1.434e−06; 1.33e−12; 6.176e−07; 0.001558; 0.0001165; 1.224e−05; 2.919e−05 |
| TCP10L2 | 2.827e−08; 1.839e−13; 2.827e−08; 0.05916; 0.002115; 2.827e−08; 1.839e−13; 5.397e−10; 2.827e−08; 1.681e−08; 2.827e−08; 0.05916; 0.05916; 2.827e−08; 2.827e−08; 2.827e−08; 0.002115; 2.659e−15; 2.827e−08; 0.002115 | FN3K | 3.601e−15; 2.2e−16; 2.2e−16; 2.2e−16; 7.008e−14; 5.917e−14; 2.2e−16; 2.2e−16; 3.693e−15; 8.115e−12; 2.2e−16; 2.2e−16; 1.004e−14; 2.2e−16; 2.2e−16; 2.2e−16; 2.34e−15; 1.086e−12; 5.716e−11; 2.2e−16 |
| USP42 | 8.146e−06; 5.25e−08; 3.105e−06; 7.77e−09; 6.014e−08; 1.827e−05; 5.514e−06; 2.713e−12; 1.47e−06; 2.074e−08; 1.207e−05; 2.2e−16; 1.071e−09; 5.526e−05; 8.015e−08; 2.506e−09; 2.724e−08; 4.573e−09; 4.254e−08; 9.679e−07 | ZNF397 | 1.248e−07; 1.928e−11; 1.546e−08; 0.0003084; 2.58e−07; 2.197e−10; 4.344e−09; 3.178e−09; 1.894e−07; 4.818e−07; 1.745e−07; 5.714e−07; 1.324e−08; 3.879e−08; 0.0007368; 1.297e−06; 9.295e−11; 0.001568; 1.013e−06; 1.851e−10 |
| RSPH10B2 | 3.943e−06; 1.715e−08; 1.137e−09; 7.13e−07; 1.137e−09; 1.137e−09; 2.2e−16; 2.125e−07; 5.962e−06; 1.859e−08; 2.125e−07; 1.859e−08; 3.81e−15; 7.13e−07; 5.557e−10; 2.994e−15; 1.137e−09; 3.81e−15; 1.137e−09; 4.812e−15 | ST8SIA3 | 4.258e−07; 1.938e−11; 1.395e−08; 3.546e−09; 1.083e−09; 7.239e−08; 1.053e−12; 1.869e−11; 3.142e−13; 4.053e−08; 0.0002735; 2.589e−09; 5.107e−11; 5.527e−08; 4.551e−12; 5.483e−07; 3.09e−06; 3.728e−09; 1.123e−10; 1.228e−10 |
| TSPAN13 | 3.23e−09; 0.0002985; 6.574e−09; 5.704e−09; 1.177e−07; 1.14e−07; 3.17e−08; 3.166e−09; 1.357e−11; 3.226e−08; 0.004392; 8.411e−06; 3.786e−09; 9.255e−11; 5.003e−06; 0.0004467; 2.607e−15; 7.238e−08; 1.168e−06; 1.769e−09 | SOCS6 | 6.812e−10; 5.062e−07; 0.002621; 4.992e−08; 1.139e−11; 7.118e−10; 4.939e−09; 8.458e−10; 3.635e−08; 1.058e−14; 1.731e−13; 5.018e−14; 2.282e−10; 8.185e−08; 5.747e−09; 2.107e−11; 3.201e−08; 4.951e−08; 2.345e−10; 1.587e−07 |
| FKBP9 | 4.103e−08; 1.211e−06; 1.108e−06; 7.133e−06; 8.595e−10; 1.529e−07; 3.379e−07; 7.999e−06; 4.024e−08; 3.486e−07; 3.751e−07; 1.123e−10; 0.000135; 2.1e−05; 0.001191; 1.432e−08; 9.047e−08; 2.365e−12; 1.489e−07; 9.191e−06 | GRIN3B | 2.489e−08; 2.002e−07; 2.35e−06; 5.03e−08; 0.0001202; 8.835e−07; 2.841e−07; 3.619e−12; 2.706e−05; 1.066e−05; 7.688e−09; 4.968e−09; 4.763e−09; 1.112e−12; 1.868e−09; 1.209e−06; 5.527e−05; 4.149e−09; 5.303e−09; 1.912e−06 |
| DPY19L1 | 2.254e−06; 6.938e−10; 4.337e−07; 4.86e−05; 2.319e−05; 2.13e−08; 2.148e−08; 9.745e−12; 6.837e−08; 9.129e−11; 7.257e−07; 1.615e−08; 7.356e−09; 4.067e−06; 2.027e−09; 5.254e−10; 1.128e−05; 0.0151; 1.804e−11; 1.07e−06 | MIDN | 7.146e−07; 7.617e−08; 0.0002294; 9.122e−06; 3.904e−07; 2.078e−10; 1.993e−06; 2.882e−10; 3.714e−05; 1.288e−08; 0.0009702; 4.361e−09; 4.98e−09; 4.917e−08; 1.091e−07; 1.04e−08; 1.31e−11; 9.209e−10; 1.085e−08; 6.268e−11 |
| C7orf10 | 2.074e−14; 2.2e−16; 3.231e−10; 2.505e−14; 1.735e−12; 1.514e−13; 2.2e−16; 0.0003066; 2.2e−16; 4.171e−14; 4.677e−12; 0.001274; 1.413e−12; 2.2e−16; 2.2e−16; 1.916e−09; 8.513e−06; 8.939e−07; 2.406e−14; 2.2e−16 | ZNF554 | 1.496e−09; 5.349e−11; 4.322e−07; 9.857e−06; 9.308e−10; 2.905e−12; 6.793e−10; 8.603e−14; 8.519e−09; 9.772e−08; 4.301e−12; 2.044e−08; 6.881e−12; 3.956e−11; 1.101e−08; 3.065e−05; 1.754e−08; 8.061e−08; 6.419e−09; 9.281e−06 |
| CDC14C | 6.075e−08; 5.658e−07; 3.845e−08; 0.0001254; 1.927e−07; 1.225e−10; 1.454e−08; 6.49e−09; 3.331e−10; 8.466e−07; 2.65e−06; 1.617e−06; 1.514e−08; 2.461e−05; 4.303e−06; 5.44e−08; 1.407e−07; 4.893e−07; 4.126e−05; 5.069e−10 | HSD11B1L | 7.692e−07; 9.182e−10; 1.234e−07; 3.911e−08; 5.676e−06; 2.715e−13; 4.359e−09; 8.444e−09; 4.174e−08; 2.729e−08; 2.807e−07; 3.917e−09; 1.181e−07; 0.0003443; 0.003023; 3.835e−05; 3.672e−09; 4.902e−05; 2.072e−06; 1.045e−08 |
| LOC100287834 | 1.071e−12; 1.852e−14; 2.838e−05; 1.95e−11; 7.37e−11; 9.657e−14; 3.025e−15; 1.584e−08; 1.265e−14; 5.436e−05; 5.57e−09; 5.855e−10; 4.656e−09; 2.45e−15; 4.029e−06; | ZNF486 | 4.685e−12; 1.486e−07; 6.37e−12; 5.466e−11; 3.505e−14; 4.569e−11; 3.675e−13; 4.127e−09; 3.165e−09; 5.909e−08; 8.093e−12; 1.651e−06; 8.806e−13; 9.734e−10; 8.64e−09; |

TABLE 3-continued

Wilcox rank sum test values of 207 genes in each round

| Gene name | p values in 20 rounds of detection | Gene name | p values in 20 rounds of detection |
|---|---|---|---|
| ZNF273 | 5.626e−12; 7.447e−14; 7.18e−13; 3.101e−15; 2.294e−08 1.523e− 12; 3.256e−11; 1.376e−08; 7.614e−05; 8.32e−10; 6.613e−09; 2.648e−09; 1.053e−14; 1.351e−06; 1.995e−07; 1.851e−09; 0.005108; 1.417e−05; 3.167e−07; 0.1556; 2.118e−06; 7.067e−07; 1.443e−10; 2.609e−09; 0.0005278 | ACTN4 | 4.802e−14; 5.345e−14; 0.0002706; 7.823e−15; 1.927e−11 3.688e−12; 4.573e−09; 4.073e−11; 2.577e−14; 2.661e−13; 2.03e−14; 2.437e−11; 1.534e−09; 1.62e−11; 8.885e−11; 1.178e−10; 2.293e−06; 2.762e−09; 2.2e−16; 2.2e−16; 1.572e−05; 1.62e−13; 2.214e−06; 2.2e−16; 4.078e−09 |
| NSUN5 | 2.67e−10; 8.554e−06; 2.67e−10; 2.67e−10; 8.554e−06; 8.554e−06; 2.67e−10; 2.67e−10; 8.554e−06; 8.554e−06; 2.67e−10; 2.67e−10; 2.67e−10; 2.67e−10; 2.67e−10; 2.67e−10; 2.67e−10; 2.67e−10; 2.67e−10; NA | KLC3 | 6.744e−07; 4.438e−09; 4.734e−11; 3.152e−07; 1.429e−07; 6.904e−09; 4.097e−10; 2.078e−08; 2.93e−07; 7.297e−07; 4.879e−07; 5.441e−08; 1.394e−07; 6.301e−13; 1.355e−09; 0.0002356; 3.965e−07; 6.568e−05; 8.377e−12; 3.329e−14 |
| NSUN5P1 | NA; 4.617e−08; 4.617e−08; 4.617e−08; 4.617e−08; 4.617e−08; 4.617e−08; NA; 4.617e−08; 4.617e−08; NA; 4.617e−08; 4.617e−08; 4.617e−08; 4.617e−08; 4.617e−08; NA; 4.617e−08; 4.617e−08; 4.617e−08 | NANOS2 | 6.158e−07; 3.381e−06; 3.363e−08; 2.468e−06; 3.248e−08; 5.385e−05; 2.31e−07; 1.284e−07; 1.353e−05; 4.726e−07; 1.584e−05; 1.231e−06; 2.179e−06; 3.397e−07; 2.877e−05; 2.704e−07; 1.033e−10; 6.406e−08; 5.169e−08; 6.868e−05 |
| HBP1 | 1.225e−10; 2.37e−14; 2.514e−14; 1.754e−09; 2.205e−11; 4.373e−10; 7.717e−14; 1.234e−08; 4.675e−14; 1.17e−05; 1.313e−11; 9.544e−14; 8.954e−09; 1.949e−10; 6.862e−11; 6.809e−08; 1.425e−12; 3.21e−14; 7.993e−08; 1.781e−08 | SYT3 | 1.178e−13; 3.267e−08; 2.495e−12; 3.162e−16; 4.296e−11; 1.761e−13; 1.413e−12; 0.02045; 8.781e−13; 2.668e−14; 5.586e−15; 5.796e−14; 2.047e−08; 1.937e−09; 1.943e−13; 3.174e−15; 6.927e−15; 2.339e−15; 2.086e−13; 6.717e−15 |
| ST7 | 2.542e−07; 5.703e−11; 1.431e−07; 1.804e−10; 1.257e−11; 5.467e−16; 5.251e−09; 2.2e−16; 2.626e−08; 7.455e−13; 1.43e−11; 4.595e−05; 6.754e−09; 1.048e−12; 2.314e−10; 1.546e−15; 2.191e−05; 5.823e−13; 3.725e−07; 4.976e−10 | CD33 | 2.232e−12; 0.0015; 2.124e−09; 1.435e−08; 2.586e−12; 1.337e−11; 5.247e−10; 3.764e−05; 5.364e−07; 3.817e−11; 3.89e−09; 0.001575; 2.652e−05; 4.616e−06; 2.221e−09; 2.2e−16; 4.461e−07; 1.95e−06; 6.285e−10; 7.143e−08 |
| LRGUK | 3.646e−09; 3.012e−07; 2.496e−06; 2.033e−06; 1.213e−05; 1.874e−08; 6.551e−07; 4.479e−07; 1.221e−09; 4.735e−09; 9.066e−09; 1.741e−08; 4.331e−07; 1.288e−09; 3.299e−11; 2.403e−07; 1.094e−08; 2.112e−10; 2.486e−07; 7.853e−07 | AURKC | 8.675e−09; 3.873e−06; 1.047e−10; 5.399e−06; 2.291e−09; 4.61e−07; 3.675e−09; 2.188e−07; 2.347e−07; 5.58e−09; 2.777e−07; 6.027e−10; 2.502e−08; 3.175e−09; 7.792e−09; 2.265e−09; 9.701e−11; 2.226e−06; 6.789e−09; 1.912e−06 |
| C7orf55 | 1.359e−05; 4.194e−10; 2.447e−09; 2.437e−09; 4.755e−07; 4.163e−07; 2.287e−08; 4.499e−08; 1.035e−10; 4.204e−06; 2.811e−05; 4.393e−08; 3.008e−07; 2.011e−07; 5.992e−10; 3.214e−07; 0.0005906; 1.568e−07; 0.0002232; 8.689e−10 | RAD21L1 | 9.023e−09; 1.248e−08; 1.462e−07; 1.144e−05; 9.875e−09; 6.835e−07; 1.531e−09; 4.375e−07; 8.783e−07; 2.81e−06; 0.0004668; 2.329e−07; 4.164e−07; 2.587e−06; 6.06e−08; 8.507e−07; 0.0008979; 1.174e−07; 6.674e−08; 0.001229 |
| FAM115C | 2.67e−10; 2.67e−10; 2.67e−10; 2.67e−10; 2.67e−10; 2.67e−10; NA; NA; 2.67e−10; 2.67e−10; 2.67e−10; 2.67e−10; 2.67e−10; 2.67e−10; 2.67e−10; 2.67e−10; 2.67e−10; 2.67e−10; NA; 2.67e−10 | HM13 | 2.2e−16; 3.183e−10; 8.377e−10; 9.894e−14; 1.556e−10; 2.2e−16; 7.041e−10; 1.455e−07; 5.702e−13; 4.883e−11; 2.517e−14; 1.163e−12; 3.214e−10; 1.376e−12; 1.57e−14; 1.392e−09; 1.077e−07; 6.534e−16; 4.939e−16; 1.42e−09 |
| CUL1 | 3.281e−11; 2.427e−08; 1.729e−07; 1.034e−08; 0.0007725; 3.638e−05; 2.646e−07; 1.123e−10; 4.72e−08; 5.74e−11; 2.238e−06; 3.166e−08; 8.137e−08; 3.536e−10; 3.171e−05; 5.344e−07; 0.0001764; 7.511e−11; 1.154e−06; 0.0002062 | SLC32A1 | 2.464e−07; 0.000835; 4.955e−05; 8.051e−07; 7.178e−08; 6.711e−06; 3.201e−05; 1.17e−07; 5.485e−07; 8.466e−07; 1.045e−06; 1.238e−06; 3.136e−14; 4.995e−08; 1.656e−06; 1.642e−07; 4.178e−12; 1.354e−12; 2.2e−16; 1.124e−08 |
| ACTR3B | 5.474e−11; 7.839e−12; 5.993e−14; 3.727e−11; 4.611e−09; 5.65e−07; 1.177e−05; 7.329e−16; 1.298e−11; 1.71e−09; 5.63e−11; 7.487e−12; 2.2e−16; 4.294e−10; 1.081e−11; 2.538e−06; 1.897e−11; 2.044e−14; 3.96e−09; 2.966e−09 | BCAS4 | 1.373e−05; 8.152e−09; 4.21e−06; 5.234e−08; 0.0003403; 1.852e−05; 2.371e−10; 3.52e−08; 4.17e−11; 3.696e−07; 6.933e−08; 8.145e−07; 4.558e−06; 1.211e−09; 4.883e−07; 3.966e−07; 3.941e−08; 7.133e−09; 7.226e−08; 0.7477 |
| MSRA | 3.612e−08; 1.224e−10; 2.359e−14; 2.2e−16; 1.042e−08; 1.175e−10; 3.653e−16; 1.417e−10; 4.936e−06; | GTPBP5 | 1.779e−09; 5.904e−07; 4.911e−07; 9.674e−07; 0.0002194; 2.077e−06; 9.106e−07; 6.278e−08; 9.826e−07; |

TABLE 3-continued

Wilcox rank sum test values of 207 genes in each round

| Gene name | p values in 20 rounds of detection | Gene name | p values in 20 rounds of detection |
|---|---|---|---|
| GOLGA7 | 4.681e−05; 6.067e−09; 4.94e−11; 0.0005156; 1.952e−09; 5.074e−10; 2.279e−07; 3.156e−07; 7.944e−08; 2.002e−09; 3.304e−11 3.066e−11; 7.165e−12; 7.334e−08; 9.748e−07; 3.354e−07; 0.0008493; 8.086e−09; 1.017e−07; 4.403e−10; 3.739e−10; 9.598e−13; 7.219e−05; 6.656e−09; 1.266e−07; 1.322e−12; 1.306e−05; 2.083e−10; 1.791e−10; 3.387e−09; 2.109e−07 | NCAM2 | 2.18e−05; 3.794e−05; 1.357e−06; 7.493e−08; 2.176e−05; 1.852e−06; 1.788e−05; 3.531e−10; 8.369e−09; 1.042e−05; 1.417e−07 5.214e−16; 2.06e−11; 2.2e−16; 2.2e−16; 2.2e−16; 2.2e−16; 4.206e−14; 4.151e−15; 2.2e−16; 7.314e−16; 2.2e−16; 2.2e−16; 2.2e−16; 2.2e−16; 2.2e−16; 2.2e−16; 6.604e−16; 2.2e−16; 1.141e−15; 2.2e−16 |
| FAM92A1 | 1.206e−07; 3.821e−09; 0.002186; 2.562e−12; 1.433e−12; 2.095e−10; 1.9e−12; 4.434e−10; 1.347e−07; 2.119e−07; 3.933e−10; 1.152e−06; 1.741e−12; 9.658e−09; 1.235e−08; 9.269e−06; 2.496e−07; 4.319e−09; 2.3e−06; 1.078e−09 | IL10RB | 2.996e−12; 1.549e−08; 3.247e−07; 2.2e−16; 2.2e−16; 8.015e−14; 3.055e−13; 1.878e−10; 7.197e−13; 2.955e−09; 3.993e−10; 1.972e−12; 2.829e−14; 2.2e−16; 3.516e−06; 2.2e−16; 1.193e−11; 2.2e−16; 2.2e−16; 1.542e−11 |
| PDP1 | 1.669e−11; 1.565e−11; 2.299e−10; 2.139e−07; 8.596e−08; 4.571e−07; 1.039e−05; 9.432e−07; 7.236e−10; 4.592e−09; 1.189e−05; 1.202e−07; 6.882e−09; 1.206e−07; 1.49e−09; 5.645e−11; 5.408e−06; 4.128e−08; 7.582e−13; 2.742e−06 | DSCR6 | 1.598e−11; 2.239e−16; 3.52e−09; 1.239e−10; 1.947e−06; 8.117e−12; 5.525e−10; 2.071e−13; 8.203e−10; 5.81e−07; 1.709e−11; 7.146e−07; 4.048e−10; 1.475e−06; 1.152e−07; 9.166e−08; 5.83e−09; 3.391e−07; 5.796e−15; 2.211e−13 |
| BAI1 | 8.322e−05; 3.477e−08; 3.856e−08; 0.0009445; 6.924e−08; 5.311e−13; 1.536e−10; 0.001208; 2.818e−05; 4.355e−10; 7.032e−11; 1.486e−07; 2.707e−06; 6.965e−07; 0.00645; 1.436e−07; 2.128e−10; 1.561e−07; 0.001444; 1.462e−07 | TTC3 | 2.452e−10; 1.029e−08; 1.27e−11; 3.333e−11; 4.364e−07; 5.845e−08; 7.965e−08; 9.555e−08; 8.208e−06; 9.814e−13; 2.717e−07; 4.424e−15; 6.582e−13; 7.585e−09; 0.0006671; 5.897e−10; 2.758e−07; 2.109e−05; 3.57e−13; 3.178e−08 |
| IFNA8 | 5.681e−09; 2.934e−08; 6.616e−08; 1.384e−06; 8.131e−10; 2.389e−10; 1.576e−07; 1.687e−06; 4.611e−08; 8.208e−10; 8.601e−07; 9.713e−09; 1.049e−07; 3.811e−07; 1.476e−09; 7.508e−09; 6.866e−08; 3.948e−07; 1.081e−09; 5.689e−09 | PDE9A | 3.161e−11; 2.967e−14; 1.37e−05; 5.876e−08; 0.001007; 2.2e−16; 1.919e−13; 5.776e−07; 3.499e−14; 8.592e−09; 1.533e−07; 2.003e−08; 3.904e−11; 0.0001773; 5.798e−10; 7.319e−11; 2.679e−07; 1.236e−11; 3.162e−12; 6.454e−09 |
| SMC2 | 1.681e−08; 6.462e−06; 9.353e−08; 5.038e−08; 1.638e−06; 1.093e−08; 1.826e−07; 1.483e−08; 1.154e−09; 5.698e−08; 2.886e−05; 6.842e−07; 1.896e−06; 1.923e−08; 1.201e−06; 1.627e−08; 4.644e−05; 2.546e−08; 1.614e−09; 1.312e−06 | PFKL | 1.188e−08; 6.042e−07; 1.416e−06; 1.045e−03; 2.371e−06; 3.047e−09; 2.086e−07; 1.82e−06; 0.0001262; 9.291e−12; 6.691e−05; 5.864e−15; 1.41e−11; 1.077e−05; 0.000121; 3.61e−10; 1.611e−07; 7.933e−07; 0.003504; 6.042e−05 |
| NTNG2 | 1.923e−10; 3.293e−14; 1.365e−14; 7.277e−12; 1.83e−07; 3.517e−15; 3.5e−11; 2.543e−13; 7.041e−12; 4.703e−11; 1.469e−13; 1.877e−08; 2.056e−15; 9.31e−16; 9.389e−10; 2.4e−15; 2.2e−16; 1.366e−11; 6.466e−15; 1.98e−09 | PLCXD1 | 5.762e−06; 4.31e−07; 4.788e−07; 1.321e−09; 3.255e−09; 1.779e−07; 9.351e−06; 2.752e−10; 0.0001449; 2.17e−11; 2.903e−06; 4.422e−13; 4.36e−06; 8.818e−06; 3.186e−08; 1.159e−11; 8.706e−07; 2.821e−12; 1.095e−08; 1.298e−05 |
| CELP | 4.284e−10; 1.33e−06; 3.75e−08; 1.514e−09; 6.91e−06; 1.347e−13; 3.909e−12; 2.215e−11; 1.53e−11; 2.821e−11; 5.286e−07; 2.799e−09; 1.929e−11; 1.033e−08; 7.348e−11; 3.195e−11; 3.529e−11; 7.382e−10; 5.527e−08; 3.916e−11 | XAGE2B | 1.333e−07; 1.666e−06; 2.146e−08; 1.617e−07; 5.301e−10; 1.877e−07; 2.058e−08; 1.653e−07; 3.964e−08; 2.601e−10; 3.275e−09; 5.462e−08; 3e−08; 4.531e−08; 1.288e−09; 3.655e−10; 2.303e−09; 1.524e−06; 2.075e−09; 3.321e−07 |
| SNORD24 | 5.298e−06; 1.788e−07; 1.265e−06; 4.989e−10; 0.0003163; 1.153e−06; 8.669e−08; 2.984e−06; 2.237e−07; 1.619e−08; 2.377e−06; 0.001124; 2.191e−08; 1.811e−07; 2.707e−08; 0.0005587; 1.244e−05; 6.498e−09; 2.161e−06; 3.623e−08 | RAB41 | 1.264e−05; 0.0002249; 5.343e−07; 1.769e−08; 1.882e−06; 6.767e−07; 5.473e−08; 2.327e−06; 1.843e−05; 1.046e−06; 4.259e−07; 2.137e−05; 5.962e−09; 7.215e−10; 6.866e−06; 4.654e−08; 1.479e−07; 2.104e−07; 8.513e−07; 1.931e−06 |
| SURF2 | 3.416e−09; 7.537e−05; 2.309e−08; 5.067e−09; 3.67e−07; 4.513e−09; 1.218e−10; 1.581e−08; 2.582e−08; 6.371e−07; 7.748e−05; 5.237e−05; 4.856e−06; 3.048e−09; 0.003069; 9.046e−08; 0.0002264; 5.733e−07; 3.072e−09; 3.269e−09 | XKRX | 1.521e−10; 1.957e−11; 1.794e−12; 4.082e−10; 1.065e−07; 0.0008823; 1.145e−07; 1.333e−11; 5.072e−10; 1.255e−14; 2.584e−06; 4.062e−09; 3.237e−11; 3.672e−05; 1.342e−13; 2.844e−08; 5.011e−10; 0.0006714; 2.291e−09; 4.706e−14 |

TABLE 3-continued

Wilcox rank sum test values of 207 genes in each round

| Gene name | p values in 20 rounds of detection | Gene name | p values in 20 rounds of detection |
|---|---|---|---|
| CACFD1 | 8.03e−08; 9.185e−09; 1.613e−07; 1.177e−06; 1.149e−09; 7.039e−09; 1.585e−13; 1.223e−14; 2.224e−05; 1.069e−07; 2.906e−12; 4.734e−12; 1.103e−09; 1.121e−07; 6.035e−10; 7.657e−08; 9.516e−07; 1.522e−11; 2.683e−09; 1.226e−08 | LOC100129662 | 3.613e−06; 2.283e−06; 2.817e−09; 1.525e−07; 7.289e−07; 1.377e−08; 7.24e−05; 2.761e−06; 1.432e−07; 1.055e−06; 3.642e−07; 8.876e−08; 7.485e−08; 1.653e−07; 6.486e−07; 1.735e−08; 5.973e−08; 1.133e−06; 9.375e−08; 5.353e−06 |
| LRRC26 | 1.305e−10; 1.16e−10; 3.523e−12; 1.011e−08; 2.495e−11; 4.071e−10; 1.319e−15; 6.279e−13; 4.167e−12; 1.47e−12; 9.983e−12; 6.735e−11; 6.783e−13; 1.581e−11; 1.296e−09; 7.645e−13; 1.281e−12; 4.137e−15; 4.919e−11; 4.803e−09 | MIR514A1 | 1.562e−06; 7.62e−07; 3.4e−07; 9.278e−07; 2.82e−09; 6.217e−05; 1.331e−08; 5.546e−07; 1.114e−06; 2.208e−08; 0.006554; 0.0001877; 5.288e−05; 4.316e−08; 4.213e−05; 4.01e−08; 3.897e−06; 4.121e−07; 2.763e−07; 5.285e−07 |
| SLC18A3 | 7.806e−12; 1.875e−05; 0.0003145; 1.894e−06; 2.864e−11; 8.331e−07; 1.583e−07; 7.996e−06; 5.998e−10; 1.439e−06; 7.56e−07; 1.229e−10; 5.845e−08; 1.834e−06; 4.182e−11; 3.314e−09; 1.947e−07; 6.327e−06; 1.256e−05; 4.277e−08 | FAM50A | 2.2e−16; 6.364e−12; 1.644e−10; 7.32e−10; 2.2e−16; 9.368e−12; 1.034e−14; 6.778e−10; 9.145e−16; 4.727e−10; 3.86e−12; 2.745e−13; 2.502e−09; 0.01605; 0.0002097; 4.514e−13; 3.119e−07; 4.002e−08; 4.465e−06; 3.572e−10 |
| | | LOC100507404 | 3.865e−11; 4.546e−12; 3.052e−10; 1.104e−05; 7.202e−07; 1.7e−08; 2.36e−06; 3.722e−11; 1.098e−08; 2.938e−11; 7.496e−12; 1.002e−12; 1.14e−05; 3.094e−10; 1.389e−05; 2.679e−07; 5.294e−15; 1.048e−05; 1.121e−05; 2.618e−10 |

(4) In the vicinity of TSS of the significantly differential gene selected in step (3), the RSC value matrix corresponding to the samples in training set obtained from the 20 rounds of aggregation in step (2), i.e., the data of 1959 premature delivery samples and the data of 1959 full-term delivery samples, are respectively used as input data to train the PCA and random forest models. In this example, the training of the models was completed using the PCA and random forest test packages in the R statistical software. The resulting training model was saved and used ultimately for the prediction of premature delivery.

Figure 9:
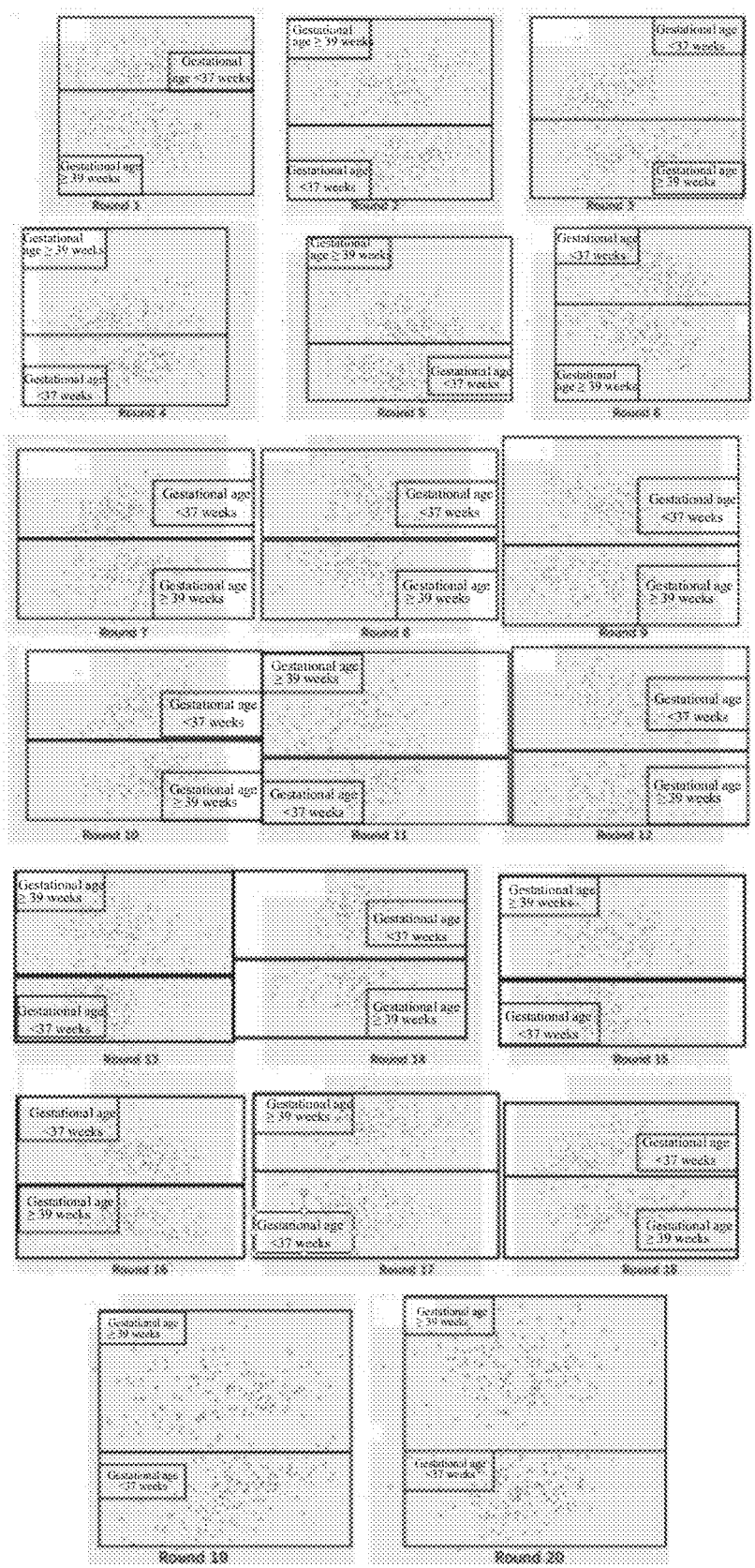
FIG. 9 is a schematic diagram of the results of classifying premature delivery samples and full-term delivery samples in a test dataset using the PCA training model according to an embodiment of the present disclosure.

(5) The RSC values of the test set obtained in (2) in the TSS region of the significantly differential gene selected in step (3) were used as inputs, the first row of the matrix in Table 4 represents the names of 207 genes, and the second row to the N-th row represent the RSC value of each sample in the premature delivery group (case group) and the full-term delivery group (control group) in the TSS region of the corresponding gene. The RSC values were inputted into the training model constructed in (4) to complete the prediction of premature delivery, and the prediction results were compared with the actual conditions of the samples to obtain the accuracy of the prediction model, as illustrated in FIG. 9 (the prediction results of PCA model) and Table 5 (the prediction results of random forest), respectively. It can be seen from FIG. 9 that the currently selected genes can clearly distinguish the two groups in the PCA grouping chart after 20 rounds of random forest prediction.

TABLE 4

Input matrix format of random forest prediction

| Phe | ESPN | H6PD | ALPL | ... ... | MIR514A1 | FAM50A | LOC100507404 |
|---|---|---|---|---|---|---|---|
| Case1 | ESPN_RSC | H6PD_RSC | ALPL_RSC | ... ... | MIR514A2_RSC | FAM51A_RSC | LOC100507405_RSC |
| ... | ESPN_RSC | H7PD_RSC | ALPL_RSC | ... ... | MIR514A2_RSC | FAM51A_RSC | LOC100507406_RSC |
| CaseN | ESPN_RSC | H8PD_RSC | ALPL_RSC | ... ... | MIR514A2_RSC | FAM51A_RSC | LOC100507407_RSC |
| Control1 | ESPN_RSC | H9PD_RSC | ALPL_RSC | ... ... | MIR514A2_RSC | FAM51A_RSC | LOC100507408_RSC |
| ... | ESPN_RSC | H10PD_RSC | ALPL_RSC | ... ... | MIR514A2_RSC | FAM51A_RSC | LOC100507409_RSC |
| CntrolN | ESPN_RSC | H11PD_RSC | ALPL_RSC | ... ... | MIR514A2_RSC | FAM51A_RSC | LOC100507410_RSC |

TABLE 5

Summary of accuracy of premature delivery prediction in test group

| Random round number | Random forest parameter setting | | |
|---|---|---|---|
| | $mtry^1$ = 140 $ntree^2$ = 700 | mtry = 200 ntree = 700 | mtry = 140 ntree = 500 |
| Round_1 | 92% | 94% | 92% |
| Round_2 | 88% | 89% | 88% |
| Round_3 | 93% | 94% | 92% |
| Round_4 | 86% | 87% | 85% |
| Round_5 | 92% | 92% | 91% |
| Round_6 | 92% | 94% | 92% |
| Round_7 | 89% | 91% | 89% |
| Round_8 | 89% | 89% | 89% |
| Round_9 | 93% | 95% | 93% |
| Round_10 | 89% | 89% | 88% |
| Round_11 | 93% | 94% | 92% |
| Round_12 | 90% | 90% | 89% |
| Round_13 | 82% | 83% | 83% |

TABLE 5-continued

Summary of accuracy of premature delivery prediction in test group

| Random round number | Random forest parameter setting | | |
|---|---|---|---|
| | mtry[1] = 140 ntree[2] = 700 | mtry = 200 ntree = 700 | mtry = 140 ntree = 500 |
| Round_14 | 92% | 93% | 90% |
| Round_15 | 88% | 89% | 87% |
| Round_16 | 91% | 92% | 91% |
| Round_17 | 92% | 93% | 92% |
| Round_18 | 88% | 89% | 87% |
| Round_19 | 87% | 85% | 86% |
| Round_20 | 93% | 93% | 93% |

Note:
[1] mtry is a parameter in the random forest software package in R and used to specify the number of variables in a node for the binary tree.
[2] ntree is a parameter in the random forest software package in R and specifies the number of decision trees that the random forest contains.

The parameters of random forest function (mtry and ntree) were adjusted to summarize the accuracy of premature delivery prediction in the test group. For example, in the first round of test, when mtry is 140 and ntree is 700, the consistency between predicted premature delivers' and real premature delivery is 92%, when mtry is 200 and ntree is 700, the consistency between predicted premature delivery and real premature delivery is 94%; when mtry is 140 and ntree is 500, the consistency between predicted premature delivery and real premature delivery is 92%; and so on for each round. Considering the prediction accuracy of 20 rounds, when mtry is 200 and ntree is 700, the prediction effect is the best, with an average of 91%.

In the description of this specification, references to descriptions of the terms "an embodiment", "some embodiments". "examples", "specific examples", or "some examples", etc. mean that a particular feature, structure, material, or characteristic described in connection with the embodiment or example is included in at least one embodiment or example of the present disclosure. In this specification, schematic representations of the above-mentioned terms are not necessarily directed to the same embodiment or example. Furthermore, the particular features, structures, materials, or characteristics described may be combined in any suitable manner in any one or more embodiments or examples. Furthermore, integrations and combinations of the various embodiments or examples and features of the various embodiments or examples described in this specification can be made by those skilled in the art without mutual conflict.

While embodiments of the present disclosure have been shown and described above, it will be understood that the above-described embodiments are illustrative and cannot be understood as being restrictive, and changes, modifications, substitutions, and variations may be made by those skilled in the art without departing from the scope of the present disclosure.

What is claimed is:

1. A method for determining a pregnancy status of a pregnant woman to be tested, comprising:
   collecting peripheral blood of the pregnant women to be tested at a gestational age of 15 to 22 weeks to obtain cell-free DNAs in the peripheral blood;
   sequencing the cell-free DNAs to obtain sequencing information of the cell-free DNAs in the peripheral blood of the pregnant woman to be tested;
   determining a predetermined parameter of the pregnant woman to be tested, the predetermined parameter comprising expression prediction information of a premature delivery-related gene of the pregnant woman, the expression prediction information of the premature delivery-related gene being obtained through calculation based on the sequencing information of the cell-free nucleic acids in the peripheral blood of the pregnant woman to be tested; and
   determining the pregnancy status of the pregnant woman to be tested based on the predetermined parameter and a prediction model,
   wherein the prediction model is constructed by:
   step 1: constructing a training set and an optional test set, the training set and the optional test set each consisting of a plurality of pregnant woman samples, the pregnant woman samples each having a known pregnancy status, wherein the plurality of pregnant woman samples comprises premature pregnant woman samples and full-term pregnant woman samples;
   step 2: determining, for each pregnant woman sample in the training set, a predetermined parameter of the pregnant woman sample, the predetermined parameter comprising differentially expressed gene information of cell-free DNAs in peripheral blood of the pregnant woman sample, the differentially expressed gene information being obtained through calculation based on sequencing information of the cell-free DNAs in the peripheral blood of the pregnant woman sample; and
   step 3: constructing the prediction model based on the known pregnancy status and the predetermined parameter,
   wherein the differentially expressed gene information is obtained by:
   (a) predicting a gene expression situation within the whole genome by using a coverage depth of sequencing reads of the cell-free DNAs in the peripheral blood of the pregnant woman sample at a gene transcription start site;
   (b) performing, for a vicinity of each gene transcription start site, significance detection on the coverage depth of the cell-free DNAs at each base site in the premature pregnant woman samples and the full-term pregnant woman samples; and
   (c) selecting, based on the significance detection, a significantly differentially expressed gene as premature delivery-related gene, to construct a sequencing model, wherein the significantly differentially expressed genes refer to genes with p<0.05/a total number of genes.

2. The method according to claim 1, wherein the pregnancy status comprises a delivery interval of the pregnant woman.

3. The method according to claim 1, wherein the prediction model is at least one of a Principal Component Analysis or Random Forest.

4. The method according to claim 1, wherein the expression prediction information of the premature delivery-related gene is obtained by:
   predicting an expression situation of the premature delivery-related gene by using a coverage depth of sequencing reads of the cell-free nucleic acids at a gene transcription start site in the peripheral blood of the pregnant woman.

5. The method according to claim 1, wherein said determining the pregnancy status of the pregnant woman to be tested based on the predetermined parameter and a prediction model further comprises:
   inputting, for each pregnant woman sample to be tested, a volume of the premature delivery-related gene, a fragment length of the vicinity, and the coverage depth of the cell-free nucleic acids at each base site in the vicinity of the transcription start site of the premature delivery-related gene into the prediction model to obtain a prediction result.

6. The method according to claim 4, wherein the premature delivery-related gene comprises genes shown in Table 1.

7. A computer-readable storage medium having a computer program stored thereon, wherein the program, when executed by a processor, implements the steps of the method according to claim 1.

8. An electronic device, comprising:
   the computer-readable storage medium according to claim 7; and
   one or more processors configured to execute the program in the computer-readable storage medium.

9. The method according to claim 1, wherein the vicinity comprises the transcription start site and 100 to 1000 bases respectively upstream and downstream of the transcription start site;
   optionally, the vicinity comprises the transcription start site, 100 bases upstream of the transcription start site, and 100 bases downstream of the transcription start site;
   optionally, the vicinity comprises the transcription start site, 400 bases upstream of the transcription start site, and 400 bases downstream of the transcription start site;
   optionally, the vicinity comprises the transcription start site, 600 bases upstream of the transcription start site, and 600 bases downstream of the transcription start site; and
   optionally, the vicinity comprises the transcription start site, 1000 bases upstream of the transcription start site, and 1000 bases downstream of the transcription start site.

10. The method according to claim 1, wherein step 3 further comprises:
   inputting, as inputs for constructing the prediction model, a number of the plurality of pregnant woman samples, the pregnancy status of each of the plurality of pregnant woman samples, a volume of the premature delivery-related gene, a fragment length of the vicinity, and the coverage depth of the cell-free nucleic acids at each base site in the vicinity of the transcription start site of the premature delivery-related gene in the training set and the optional verification set.

* * * * *